United States Patent
Cui et al.

(10) Patent No.: US 12,216,929 B2
(45) Date of Patent: *Feb. 4, 2025

(54) STORAGE SYSTEM, MEMORY MANAGEMENT METHOD, AND MANAGEMENT NODE

(71) Applicant: HUAWEI TECHNOLOGIES CO., LTD., Guangdong (CN)

(72) Inventors: Wenlin Cui, Chengdu (CN); Keji Huang, Chengdu (CN); Peng Zhang, Chengdu (CN); Siwei Luo, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/527,353

(22) Filed: Dec. 3, 2023

(65) Prior Publication Data

US 2024/0094936 A1 Mar. 21, 2024

Related U.S. Application Data

(63) Continuation of application No. 17/510,388, filed on Oct. 26, 2021, now Pat. No. 11,861,204, which is a (Continued)

(30) Foreign Application Priority Data

Apr. 28, 2020 (CN) .......................... 202010348770.0
Jul. 1, 2020 (CN) .......................... 202010625111.7

(51) Int. Cl.
*G06F 3/06* (2006.01)
*G06F 12/0802* (2016.01)

(52) U.S. Cl.
CPC .......... *G06F 3/0647* (2013.01); *G06F 3/0604* (2013.01); *G06F 3/0673* (2013.01); *G06F 12/0802* (2013.01); *G06F 2212/60* (2013.01)

(58) Field of Classification Search
CPC .... G06F 3/0647; G06F 3/0604; G06F 3/0673; G06F 12/0802; G06F 2212/60
See application file for complete search history.

(56) References Cited

U.S. PATENT DOCUMENTS 6,240,501 B1 * 5/2001 Hagersten ........... G06F 12/1018
711/170
9,933,979 B2 * 4/2018 Gu .......................... G06F 3/067
(Continued)

*Primary Examiner* — Ryan Bertram

(57) ABSTRACT

A storage system includes multiple storage nodes. Each storage node includes a first storage device of a first type and a second storage device of a second type, and a performance level of the first storage device is higher than the second storage device. The globe cache includes a first tier comprising the first storage device in each storage node, and a second tier comprising the second storage device in each storage node. The first tier is for storing data with a high access frequency, and the second tier is for storing data with a low access frequency. The management node monitors an access frequency of target data stored in the first tier. When the access frequency of the target data is lower than a threshold, the management node instructs the first storage node to migrate the target data from the first tier to the second tier.

20 Claims, 12 Drawing Sheets

Related U.S. Application Data continuation of application No. PCT/CN2020/119857, filed on Oct. 7, 2020.

(56) References Cited

U.S. PATENT DOCUMENTS

| | | |
|---|---|---|
| 10,042,751 B1 * | 8/2018 | Veprinsky ............... G06F 3/061 |
| 10,055,139 B1 * | 8/2018 | Bent ..................... G06F 3/0647 |
| 10,534,559 B2 * | 1/2020 | Jain ....................... G06F 3/0604 |
| 10,740,016 B2 * | 8/2020 | White ................... G06F 3/0685 |
| 2014/0019701 A1 * | 1/2014 | Ohira .................... G06F 3/0685 |
| | | 711/165 |
| 2014/0281323 A1 * | 9/2014 | Duluk, Jr. ........... G06F 12/1009 |
| | | 711/165 |
| 2016/0011816 A1 * | 1/2016 | Aizman ................ G06F 3/0685 |
| | | 711/117 |
| 2016/0291899 A1 * | 10/2016 | Takamura ............... G06F 3/067 |
| 2020/0117381 A1 * | 4/2020 | Deguchi ............... G06F 3/0644 |
| 2020/0142589 A1 * | 5/2020 | Galbo .................. G06F 3/0646 |
| 2020/0183859 A1 * | 6/2020 | Johns ................. H04L 67/1097 |
| 2020/0242031 A1 * | 7/2020 | Dalmatov ............. G06F 12/128 |
| 2023/0118994 A1 * | 4/2023 | Zhang ..................... G06F 3/064 |
| | | 711/117 |

\* cited by examiner

STORAGE SYSTEM, MEMORY MANAGEMENT METHOD, AND MANAGEMENT NODE

CROSS-REFERENCE TO RELATED APPLICATIONS

This application is a continuation of U.S. patent application Ser. No. 17/510,388, filed on Oct. 26, 2021, which is a continuation of International Application No. PCT/CN2020/119857, filed on Oct. 7, 2020, which claims priority to Chinese Patent Application No. 202010625111.7, filed on Jul. 1, 2020, and Chinese Patent Application No. 202010348770.0, filed on Apr. 28, 2020. All of the aforementioned priority applications are hereby incorporated by reference in their entirety.

TECHNICAL FIELD

This application relates to the field of storage technologies, and in particular, to a storage system, and a method for creating a globe cache in a storage system.

BACKGROUND

With maturity of storage class memory (SCM) products, memory types become richer. However, currently, it is usually limited that a memory is used in a storage node, and a performance advantage of the memory is not fully utilized.

SUMMARY

A first aspect of this application provides a storage system. The storage system includes a management node, one or more first storage devices, and one or more second storage devices. The management node is configured to create a memory pool to provide a service for storing data. Performance of the first storage device is higher than that of the second storage device, at least one of the one or more first storage devices is located in a first storage node, and at least one of the one or more second storage devices is located in a second storage node. The management node is further configured to control the data to be migrated between the first storage device and the second storage device in the memory pool.

The memory pool provided in the first aspect includes at least the following several cases: (1) The first storage node includes a first storage device and a second storage device, the second storage node also includes a first storage device and a second storage device, and all first storage devices and all second storage devices are a part of the memory pool; (2) the first storage node includes only a first storage device, the second storage node includes only a second storage device, and both the first storage device and the second storage device are a part of the memory pool; and (3) the first storage node includes a first storage device and a second storage device, the second storage node includes only one of the first storage device or the second storage device, and both the first storage devices and the second storage devices are a part of the memory pool. In addition, the storage system may further include another storage node, and various types of storage devices included in the other storage node may also provide storage space for the memory pool.

The first storage device and the second storage device differ in performance due to different types. Performance of the first storage device is generally higher than performance of the second storage device. The performance herein refers to an operation speed and/or an access latency of a storage device. For example, the first storage device is a dynamic random access memory, and the second storage device is a storage class memory. In addition, the first storage device and the second storage device in the first aspect are classified based on types. For example, a dynamic random access memory is referred to as a first storage device regardless of whether the dynamic random access memory is located in the first storage node or the second storage node. A storage class memory is referred to as a second storage device regardless of whether the storage class memory is located in the first storage node or the second storage node. Likewise, the memory pool may further include a third storage device, a fourth storage device, and the like.

In the storage system in the first aspect, a memory pool is created based on storage devices with a plurality of types of performance, and these storage devices with the plurality of types of performance are located in different storage nodes, thereby implementing a cross-node memory pool that integrates storage devices with different performance. In this way, various types of storage devices (regardless of memories or hard disks) can serve as storage resources to provide storage services for upper-layer applications, thereby better using their performance advantages. Because the memory pool includes storage devices with different performance, data can be controlled to be migrated between the storage devices with different performance based on an access frequency of the data. The data can be migrated to a high-performance storage device when an access frequency of the data is relatively high, so as to improve data reading efficiency; and the data can be migrated to a low-performance storage device when the access frequency of the data is relatively low, so as to save storage space of the high-performance storage device. In addition, the memory pool in this application provides storage space for a computing node or a LUN, and changes a processor-centric architecture of a memory resource.

In an implementation, the management node is further configured to obtain status information of the storage devices, where the status information includes a type and a capacity of the first storage device and a type and a capacity of the second storage device. A capacity of the memory pool depends on a capacity of a storage device provided by each storage node for the memory pool, and a type of a storage device included in the memory pool depends on a type of a storage device provided by each storage node for the memory pool. Therefore, before creating the memory pool, the management node needs to collect status information of a storage device from each storage node.

In addition, the memory pool may be scaled out when available space is insufficient or a new storage node is discovered in the storage system. During scaling-out, the management node also needs to collect status information of a storage device from the new storage node.

In an implementation, the storage space of the memory pool includes several pages; a location of a page in the memory pool is referred to as a global address; the global address is mapped to a physical address of the page; and the physical address of the page is used to indicate a location, of physical space allocated to the page, in a storage device in a storage node. For example, a size of the page is 4 KB, 8 KB, 16 KB, or the like. The size of the page can be fixed or configured as required. A memory pool with pages of different sizes is used more flexibly.

In an implementation, both the first storage node and the second storage node store an index table, and the index table is used to record a mapping relationship between the global address of the page and the physical address of the page.

In an implementation, physical addresses may be pre-allocated to global addresses of some pages, and a mapping relationship between the global addresses and the physical addresses is recorded in the index table. In this way, when receiving data write requests for these pages, the storage node can directly find physical addresses based on the index table; therefore, to-be-written data is written into physical space indicated by the physical addresses. In a pre-allocation manner, when a data write request is executed, the data may be directly written into pre-allocated physical space, thereby improving data write efficiency.

In an implementation, no physical address may be allocated to pages in advance. Instead, when receiving data write requests for these pages, the storage node allocates physical space from a storage device, writes to-be-written data into the physical space, and records a mapping relationship between global addresses and physical addresses of the pages in the index table. This on-demand allocation mode allows the physical space to be allocated more flexibly, thereby saving space.

When any storage node updates the index table, updated content can be sent to another node and the management node. In this way, each storage node has a complete index table, thereby avoiding non-transparent information. Because each storage node can receive a data read request from a computing node, a physical address of to-be-read data can be queried for by using the index table, to obtain correct data.

In the storage system in the first aspect, this application provides at least three implementations for executing a data write request.

In an implementation, the first storage node includes an IO controller, the IO controller stores the index table, and the IO controller communicates with the computing node. The IO controller is configured to: receive first data and a first logical address of the first data that are sent by the computing node; determine a first global address of the first data in the memory pool based on the first logical address; determine, based on the index table, whether physical space has been allocated to the first global address; and when the physical space is determined to have been allocated to the first global address, write the first data into the physical space indicated by a first physical address. In this implementation, the first storage node communicates with the computing node by using LUN semantics, and the first logical address refers to a LUN ID, an LBA, and a length.

Correspondingly, in the foregoing implementation, if the IO controller is configured to receive the data read request sent by the computing node, to read the first data, and the data read request carries the first logical address, the IO controller determines the first global address of the first data in the memory pool based on the first logical address, and determines, based on the index table, the first physical address corresponding to the first global address, and reads the first data from the physical space indicated by the first physical address.

In an implementation, the first storage node communicates with the computing node by using memory semantics. In this case, the first logical address refers to an ID, a start address, and a length of virtual space. In addition, an execution process of the data write request is the same as that in the foregoing implementation procedure. A process of executing a data read request is also the same as that in the foregoing implementation procedure.

In an implementation, each storage node in the storage system maps a local memory pool of the storage node to the computing node, so that the computing node can "sense" the memory pool, and obtain a global address of the memory pool. In this case, the data write request sent by the computing node to the first storage node can directly carry the global address, and the IO controller in the first storage node determines, based on the index table, the physical address corresponding to the global address, and writes the data into the physical space indicated by the physical address. Correspondingly, in this implementation, if the computing node sends the data read request to the first storage node, and the data read request also carries a global address of the to-be-read data, the IO controller can directly determine, based on the index table, a physical address corresponding to the global address. In this implementation, both data write efficiency and data read efficiency can be improved because a step of converting a logical address into a global address is removed.

In an implementation, when controlling the data to be migrated between the first storage device and the second storage device in the memory pool, the management node is specifically configured to: indicate each storage node to monitor an access frequency of local data of the storage node; and indicate the storage node to migrate the data to a storage device with higher performance when the access frequency is higher than a specific threshold, or indicate the storage node to migrate the data to a storage device with lower performance when the access frequency is lower than a specific threshold. It should be noted that the migration herein may be performed within a storage node or across storage nodes.

In the foregoing implementation, the access frequency may be monitored with a granularity of a page, and data migration may be performed with a granularity of a page. Alternatively, the access frequency may be monitored with a granularity of a data item, and migration may be performed with a granularity of a data item. A data item is a unit whose granularity is smaller than that of a page. Monitoring with a granularity of a data item can more accurately identify hot data (or non-hot data), and migrate real hot data to a storage device with higher performance, thereby improving data read efficiency.

In an implementation, the memory provided in the first aspect further supports data prefetching. Specifically, in any one of the foregoing data read request execution processes or after the data read request is completed, other data associated with the to-be-read data is prefetched to a storage device with higher performance. The associated data is data whose logical address and a logical address of the to-be-read data are consecutive. Data prefetching can improve a hit rate of a high-performance storage device and improve data read efficiency.

In an implementation, the storage system in the first aspect is applicable to a scenario in which computing is separated from storage. In other words, the computing node is independent of any storage node in the system. Computing nodes communicate with storage nodes over an external network, which facilitates scaling out. For example, when computing resources are insufficient, a quantity of computing nodes can be increased, and a quantity of storage nodes remains unchanged. When storage resources are insufficient, a quantity of storage nodes can be increased, and a quantity of computing nodes remains unchanged.

In an implementation, the storage system in the first aspect is applicable to a scenario in which computing and storage are combined. In other words, a computing node and a storage node are integrated into a same physical device, and the physical device that integrates computing and storage may be referred to as a storage server or a storage node. In this case, the computing node communicates with the storage node over an internal network. Therefore, when a data read request or a data write request is executed, an access latency is relatively low.

A second aspect provides a memory management method. The method is applied to a storage system, and a management node or a storage node in the storage system performs method steps in the method, to implement a function of the first aspect.

A third aspect provides a management node. The management node is located in the storage system provided in the first aspect, and the storage system includes one or more first storage devices and one or more second storage devices. The management node includes a creation module and a control module. The creation module is configured to create a memory pool to provide a service for storing data. The memory pool includes the one or more first storage devices and the one or more second storage devices, performance of the first storage device is higher than that of the second storage device, at least one of the one or more first storage devices is located in a first storage node, and at least one of the one or more second storage devices is located in a second storage node. The control module is configured to control the data to be migrated between the first storage device and the second storage device in the memory pool.

In the management node provided in the third aspect, a memory pool is created based on storage devices with a plurality of types of performance, and these storage devices with the plurality of types of performance are located in different storage nodes, thereby implementing a cross-node memory pool that integrates storage devices with different performance. In this way, various types of storage devices (regardless of memories or hard disks) can serve as storage resources to provide storage services for upper-layer applications, thereby better using their performance advantages. Because the memory pool includes storage devices with different performance, data can be controlled to be migrated between the storage devices with different performance based on an access frequency of the data. The data can be migrated to a high-performance storage device when an access frequency of the data is relatively high, so as to improve data reading efficiency; and the data can be migrated to a low-performance storage device when the access frequency of the data is relatively low, so as to save storage space of the high-performance storage device. In addition, the memory pool in this application provides storage space for a computing node or a LUN, and changes a processor-centric architecture of memory resources.

In an implementation, the creation module is further configured to obtain status information of the storage devices, where the status information includes a type and a capacity of the first storage device and a type and a capacity of the second storage device. The creation module is specifically configured to create the memory pool based on the status information.

In an implementation, storage space of the memory pool includes several pages; a global address of a page in the memory pool is mapped to a physical address of the page; the global address of the page is used to indicate a location of the page in the memory pool; and the physical address of the page is used to indicate a location, of physical space allocated to the page, in a storage device in a storage node.

In an implementation, the data is stored in the first storage device. The control module is specifically configured to indicate the first storage node to obtain an access frequency of the data; and indicate the first storage node to migrate the data to the second storage device in the memory pool when the access frequency is lower than a specified frequency threshold.

A fourth aspect provides a management node. The management node is located in the storage system provided in the first aspect, and the storage system includes one or more first storage devices and one or more second storage devices. The management node includes an interface and a processor. The processor is configured to create a memory pool to provide a service for storing data. The memory pool includes the one or more first storage devices and the one or more second storage devices, performance of the first storage device is higher than that of the second storage device, at least one of the one or more first storage devices is located in a first storage node, and at least one of the one or more second storage devices is located in a second storage node. The processor is further configured to control the data to be migrated between the first storage device and the second storage device in the memory pool. The interface is configured to communicate with the first storage node and the second storage node.

In the management node provided in the fourth aspect, a memory pool is created based on storage devices with a plurality of types of performance, and these storage devices with the plurality of types of performance are located in different storage nodes, thereby implementing a cross-node memory pool that integrates storage devices with different performance. In this way, various types of storage devices (regardless of memories or hard disks) can serve as storage resources to provide storage services for upper-layer applications, thereby better using their performance advantages. Because the memory pool includes storage devices with different performance, data can be controlled to be migrated between the storage devices with different performance based on an access frequency of the data. The data can be migrated to a high-performance storage device when an access frequency of the data is relatively high, so as to improve data reading efficiency; and the data can be migrated to a low-performance storage device when the access frequency of the data is relatively low, so as to save storage space of the high-performance storage device. In addition, the memory pool in this application provides storage space for a computing node or a LUN, and changes a processor-centric architecture of memory resources.

In an implementation, the processor is further configured to obtain status information of the storage devices, where the status information includes a type and a capacity of the first storage device and a type and a capacity of the second storage device. The processor is specifically configured to create the memory pool based on the status information.

In an implementation, the storage space of the memory pool includes several pages; a global address of a page in the memory pool is mapped to a physical address of the page; the global address of the page is used to indicate a location of the page in the memory pool; and the physical address of the page is used to indicate a location, of physical space allocated to the page, in a storage device in a storage node.

In an implementation, the data is stored in the first storage device. The processor is specifically configured to indicate the first storage node to obtain an access frequency of the data; and indicate the first storage node to migrate the data to the second storage device in the memory pool when the access frequency is lower than a specified frequency threshold.

A fifth aspect provides a computer-readable storage medium. The storage medium stores a program instruction, and the program instruction is used to perform the following method: creating a memory pool to provide a service for storing data, where the memory pool includes one or more first storage devices and one or more second storage devices, performance of the first storage device is higher than that of the second storage device, at least one of the one or more first storage devices is located in a first storage node, and at least one of the one or more second storage devices is located in a second storage node; and controlling the data to be migrated between the first storage device and the second storage device in the memory pool.

In an implementation, the method further includes: obtaining status information of the storage devices, where the status information includes a type and a capacity of the first storage device and a type and a capacity of the second storage device. The creating a memory pool specifically includes: creating the memory pool based on the status information.

In an implementation, storage space of the memory pool includes several pages; a global address of a page in the memory pool is mapped to a physical address of the page; the global address of the page is used to indicate a location of the page in the memory pool; and the physical address of the page is used to indicate a location, of physical space allocated to the page, in a storage device in a storage node.

In an implementation, the controlling the data to be migrated between the first storage device and the second storage device in the memory pool specifically includes: indicating the first storage node to obtain an access frequency of the data; and indicating the first storage node to migrate the data to the second storage device when the access frequency is lower than a specified frequency threshold.

A sixth aspect provides a computer program product. The computer program product includes computer program code; and when the computer program code is run, the method performed by the management node or the computing node in any one of the foregoing aspects is performed.

DESCRIPTION OF EMBODIMENTS

The following describes technical solutions in the embodiments of the application with reference to the accompanying drawings.

Network architectures and service scenarios described in the embodiments of the application are intended to describe the technical solutions in the embodiments of the application more clearly, and constitute no limitation to the technical solutions provided in the embodiments of the application. A person of ordinary skill in the art may know that: With evolution of the network architectures and the emergence of new service scenarios, the technical solutions provided in the embodiments of the application are also applicable to similar technical problems.

Figure 1:
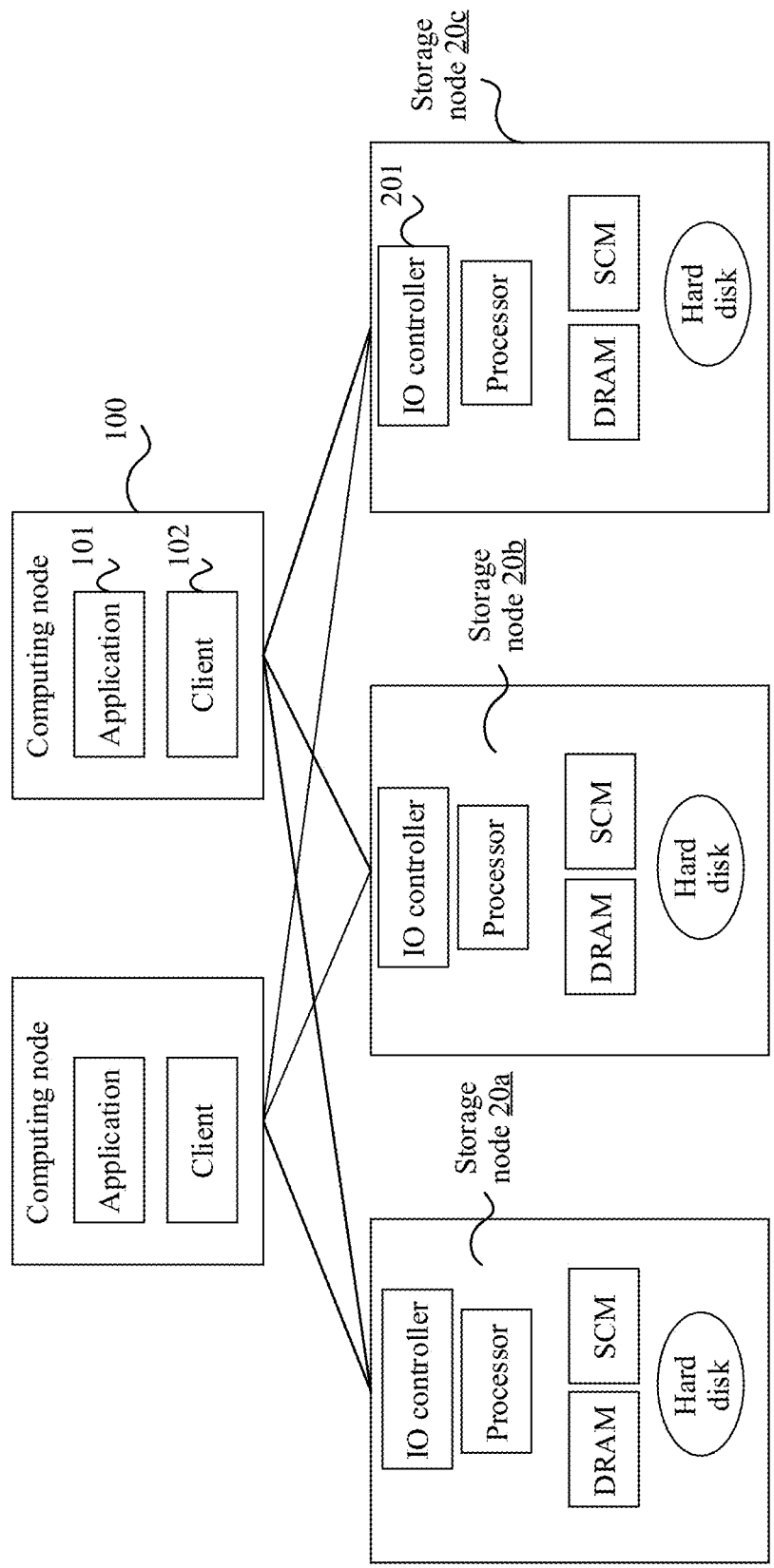
FIG. 1 is a schematic diagram of a system architecture of a storage system according to an embodiment.

A storage system provided in an embodiment includes a computing node cluster and a storage node cluster. The computing node cluster includes one or more computing nodes 100 (FIG. 1 shows two computing nodes 100, but is not limited to the two computing nodes 100). The computing node 100 is a computing device on a user side, such as a server or a desktop computer. In terms of hardware, a processor and a memory (which are not shown in FIG. 1) are disposed in the computing node 100. In terms of software, an application 101 (which is app for short) and a client program 102 (which is client for short) are run on the computing node 100. The application 101 is a general term of various applications presented to a user. The client 102 is configured to: receive a data access request triggered by the application 101, interact with a storage node 20, and send the data access request to the storage node 20. The client 102 is further configured to: receive data from the storage node, and forward the data to the application 101. It may be understood that, when the client 102 is a software program, a function of the client 102 is implemented by a processor included in the computing node 100 by running the program in a memory. The client 102 may alternatively be implemented by a hardware component located inside the computing node 100. Any client 102 in the computing node cluster may access any storage node 20 in the storage node cluster.

The storage node cluster includes one or more storage nodes 20 (FIG. 1 shows three storage nodes 20, but are not limited to the three storage nodes 20), and the storage nodes 20 may be interconnected. The storage node may be, for example, a server, a desktop computer, a controller of a storage array, or a disk enclosure. Functionally, the storage node 20 is mainly configured to calculate or process data. In addition, the storage node cluster further includes a management node (which is not shown in FIG. 1). The management node is configured to create and manage a memory pool. One storage node is selected from the storage nodes 20, to serve as a management node. The management node may communicate with any storage node 20.

In terms of hardware, as shown in FIG. 1, the storage node 20 includes at least a processor, a storage device, and an IO controller 201. The processor 202 is a central processing unit (CPU), and is configured to process data from a device outside the storage node 20 or data generated inside the storage node 20. The storage device is an apparatus configured to store data, and may be a memory or a hard disk. The memory is an internal storage device that directly exchanges data with the processor. The memory may read and write data at any time at a very high speed, and is used as a temporary data storage device of an operating system or another running program. Memories have at least two types. For example, the memory may be a random access memory, or may be a read-only memory (ROM) memory. For example, the random access memory may be a dynamic random access memory (DRAM), or may be a storage class memory (SCM). The DRAM is a semiconductor memory. Like most random access memories (RAM), the DRAM is a volatile memory device. The SCM is a compound storage technology that combines features of a conventional storage apparatus and a storage device. The storage class memory can provide a higher read/write speed than a hard disk, but provides a lower operation speed and lower costs than the DRAM.

Figure 2:
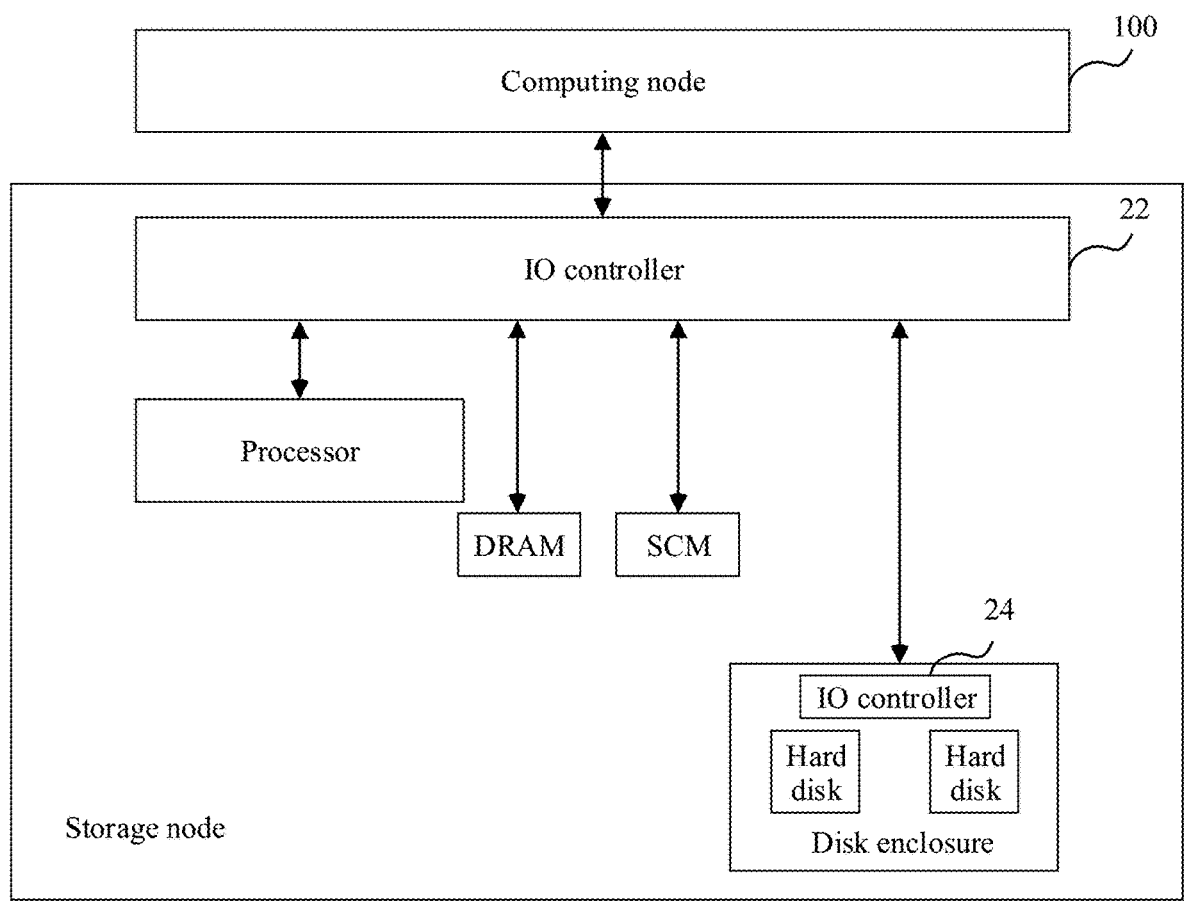
FIG. 2 is a schematic structural diagram of a storage node according to an embodiment.

However, the DRAM and the SCM are merely examples for description in this embodiment, and the memory may further include another random access memory, for example, a static random access memory (SRAM). For example, the read-only memory may be a programmable read-only memory (PROM), or an erasable programmable read-only memory (EPROM). In addition, the memory may also be a dual in-line memory module (DIMM), that is, a module including a dynamic random access memory (DRAM). In FIG. 2 and the following descriptions, a DRAM and an SCM are used as an example for description, but it does not indicate that the storage node 20 does not include another type of storage devices.

The storage device in this embodiment may alternatively be a hard disk. A difference from the memory 203 lies in that a data read/write speed of the hard disk is lower than that of the memory, and the hard disk is usually configured to persistently store data. A storage node 20a is used as an example, and one or more hard disks may be disposed inside the storage node 20a. Alternatively, a disk enclosure (which is shown in FIG. 2) may be mounted outside the storage node 20a, and a plurality of hard disks are disposed in the disk enclosure. Regardless of a deployment manner, these hard disks may be considered as hard disks included in the storage node 20a. The hard disk is a solid-state disk, a mechanical hard disk, or another type of hard disk. Similarly, other storage nodes in the storage node cluster, such as a storage node 20b and a storage node 20c, may also include various types of hard disks. A storage node 20 may include one or more storage devices of a same type.

The hard disk included in the memory pool in this embodiment may also have a memory interface, and the processor may directly access the memory interface.

FIG. 2 is a schematic diagram of an internal structure of a storage node 20. In an actual application, the storage node 20 may be a server or a storage array. As shown in FIG. 2, in addition to a processor and a storage device, the storage node 20 further includes an IO controller. Because a memory access latency is very low, operating system scheduling overheads and software overheads may become a bottleneck of data processing. To reduce software overheads, a hardware component, namely, the IO controller, is introduced in this embodiment, to implement hardware-based IO access and reduce impact of CPU scheduling and a software stack.

Firstly, the storage node 20 has its own IO controller 22 that is configured to communicate with a computing node 100 and is further configured to communicate with another storage node. Specifically, the storage node 20 may receive a request from the computing node 100 through the IO controller 22 or send a request to the computing node 100 through the IO controller 22, or the storage node 20 may send a request to a storage node 30 through the IO controller 22, or receive a request from a storage node 30 through the IO controller 22. Secondly, memories in the storage node 20 may communicate with each other through the IO controller 22, or may communicate with the computing node 100 through the IO controller 22. Finally, if hard disks included in the storage node 20 are located inside the storage node 20, these hard disks may communicate with each other through the IO controller 22, or may communicate with the computing node 100 through the IO controller 22. If the hard disks are located in a disk enclosure externally connected to the storage node 20, an IO controller 24 is disposed in the disk enclosure. The IO controller 24 is configured to communicate with the IO controller 22. The hard disk may send data or an instruction to the IO controller 22 through the IO controller 24 or receive, through the IO controller 24, data or an instruction sent by the IO controller 22. In addition, the storage node 20 may further include a bus (which is not shown in FIG. 2) configured for communication between components in the storage node 20.

Figure 3:
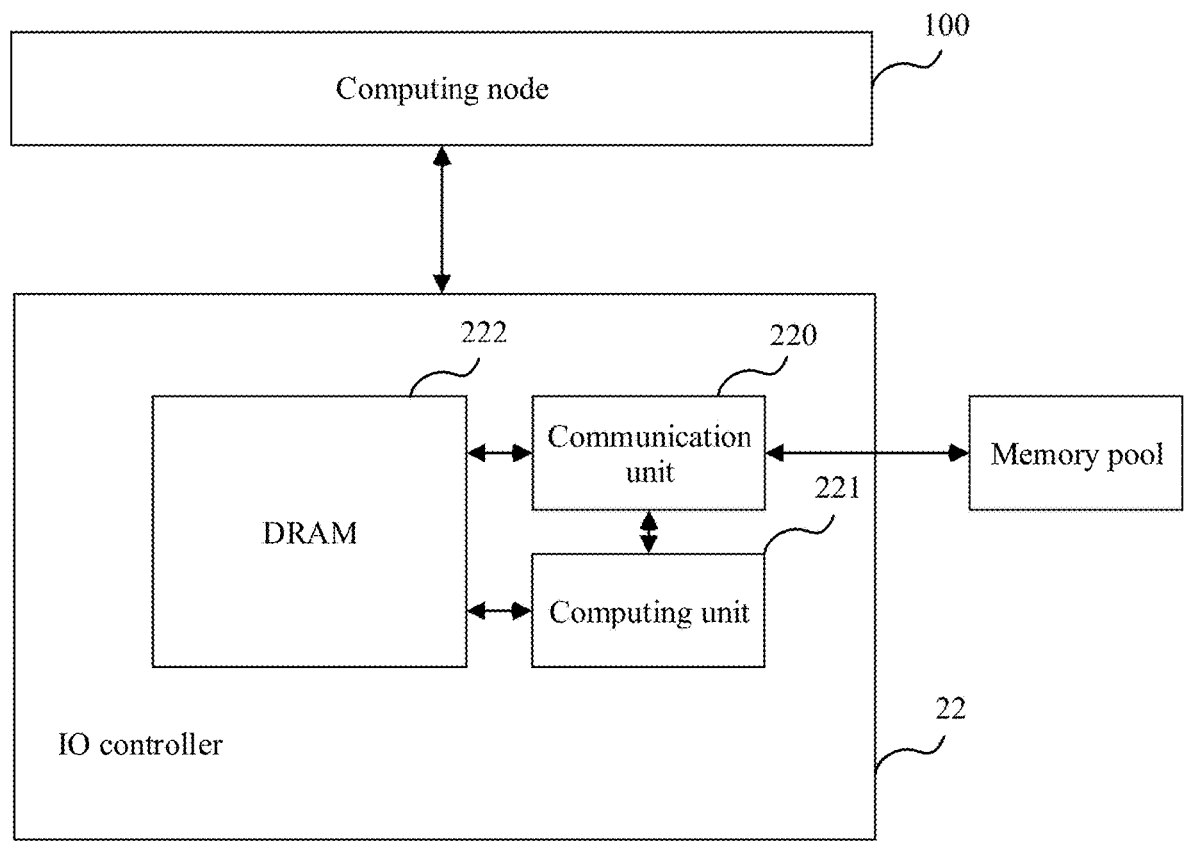
FIG. 3 is a schematic structural diagram of an IO controller according to an embodiment.

FIG. 3 is a schematic structural diagram of an IO controller. An IO controller 22 is used as an example, and the IO controller 22 includes a communication unit 220 and a computing unit 221. The communication unit provides a high network transmission capability, and is configured for external or internal communication. Herein, a network interface controller (NIC) is used as an example. The computing unit is a programmable electronic part, and is configured to perform calculation processing and the like on data. In this embodiment, a data processing unit (DPU) is used as an example for description. The DPU has universality and programmability of a CPU, but is more dedicated than the CPU. The DPU can efficiently run for a network data packet, a storage request, or an analysis request. The DPU is distinguished from the CPU by a larger degree of parallelism (which requires a large quantity of requests to be processed). Optionally, the DPU herein may alternatively be replaced by a processing chip such as a graphics processing unit (GPU) or an embedded neural-network processing unit (NPU). The DPU is configured to provide data offloading services specific to a memory pool, for example, an address indexing or query function, a partitioning function, and performing an operation such as filtering or scanning on data. After an IO request enters the storage node 20 through the NIC, the IO request is directly processed by the computing unit 221 without using a CPU and an operating system that are inside the storage node 20. In this way, a depth of the software stack is thinned, and impact of CPU scheduling is reduced. An example in which an IO read request is executed is used. After the NIC receives the IO read request sent by the computing node 100, the DPU may directly query an index table for information corresponding to the IO read request. In addition, the IO controller 22 further includes a DRAM 222. The DRAM 222 is physically consistent with the DRAM described in FIG. 2, but the DRAM 222 herein is a memory belonging to the IO controller 22. The DRAM 222 is configured to temporarily store data or an instruction that passes through the IO controller 22, and is not a part of the memory pool. In addition, the IO controller 22 may further map the DRAM 222 to the computing node 100, so that space of the DRAM 222 is visible to the computing node 100. In this way, IO access is converted into memory semantic access. A structure and a function of the IO controller 24 are similar to those of the IO controller 22, and details are not described herein again.

Figure 4:
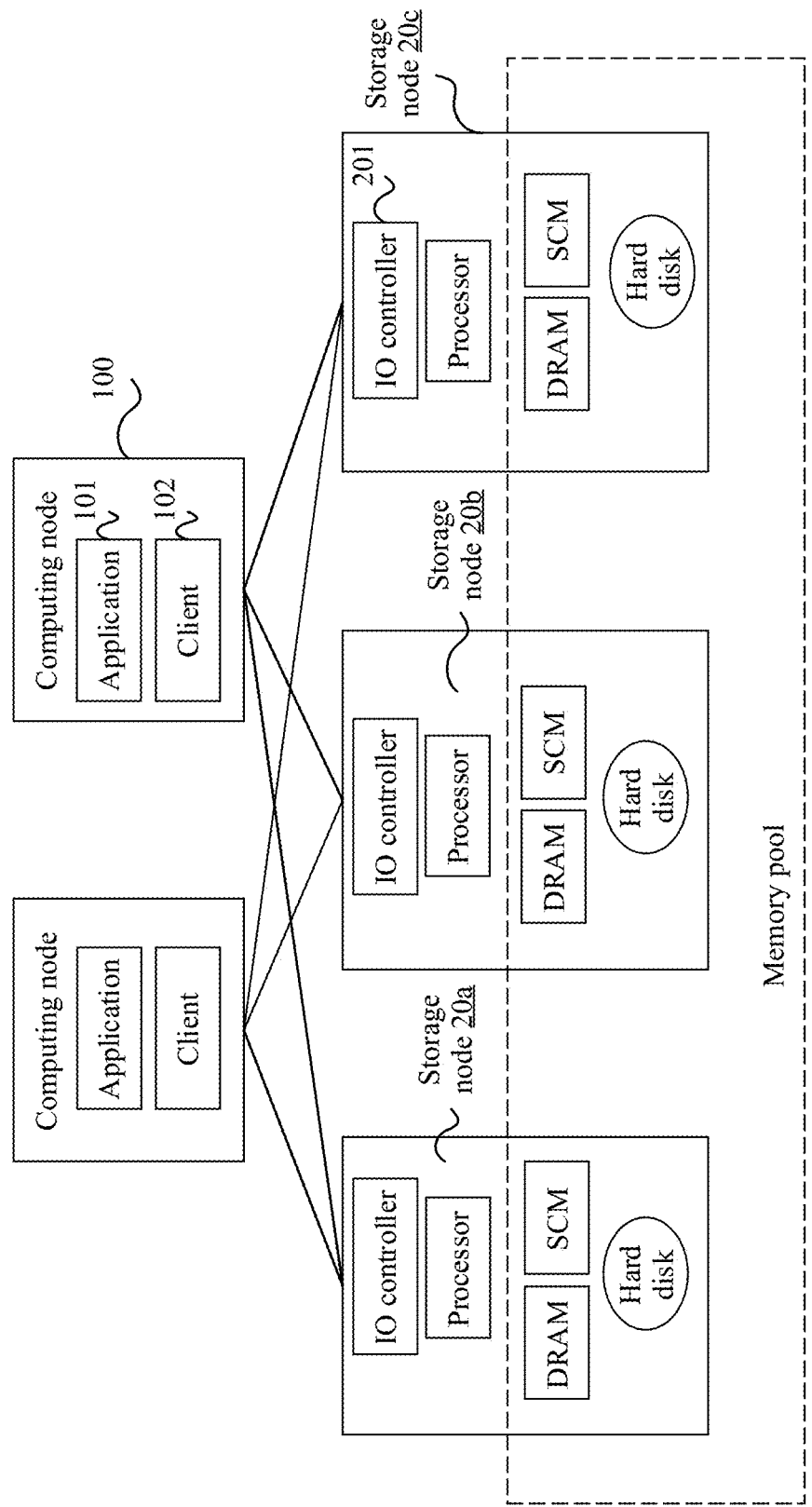
FIG. 4 is a schematic architectural diagram of a memory pool according to an embodiment.
Figure 5:
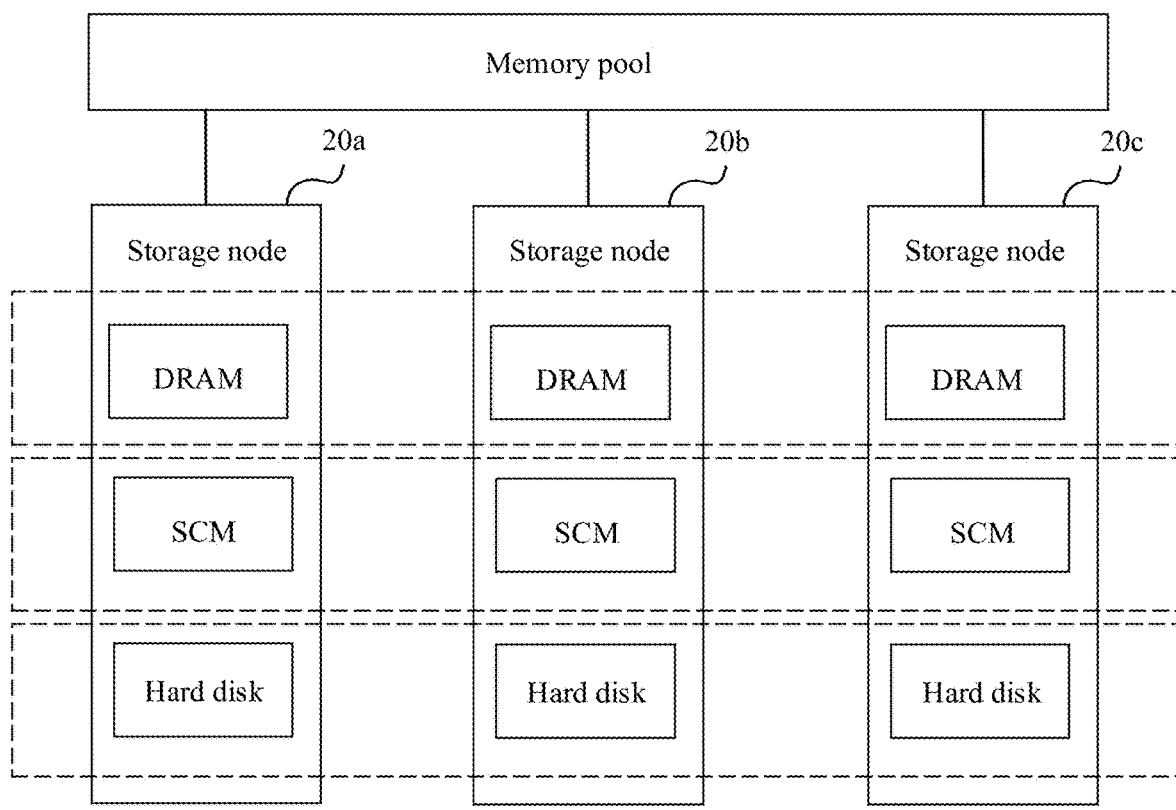
FIG. 5 is a schematic diagram of each tier of storage devices included in a memory pool according to an embodiment.

The following describes the memory pool provided in this embodiment. FIG. 4 is a schematic architectural diagram of a memory pool. The memory pool includes a plurality of different types of storage devices, and each type of storage devices may be considered as a tier of storage devices. Performance of each tier of storage devices is different from performance of another tier of storage device s. Performance of the storage device in this application is mainly considered from aspects such as an operation speed and/or an access latency. FIG. 5 is a schematic diagram of each tier of storage devices included in a memory pool according to an embodiment. As shown in FIG. 5, the memory pool includes storage devices in storage nodes 20. A DRAM of each storage node is located at a first tier in the memory pool because the DRAM has highest performance in all types of storage devices. Performance of an SCM is lower than that of the DRAM. Therefore, an SCM of each storage node is located at a second tier in the memory pool. Further, performance of a hard disk is lower than that of the SCM. Therefore, a hard disk in each storage node is located at a third tier in the memory pool. FIG. 5 shows only three types of storage devices. However, a plurality of different types of storage devices may be deployed inside the storage node 20 in product practice based on the foregoing description, that is, all types of memories or hard disks may become a part of the memory pool, and a same type of storage devices located in different storage nodes belong to a same tier in the memory pool. A type of a storage device included in the memory pool and a quantity of tiers are not limited in this application. The tiers of the memory pool are internal division and are not sensed by an upper-layer application. It should be noted that, although a same type of storage devices in each storage node are at a same tier, for a specific storage node, performance of a local DRAM of the storage node is higher than that of a DRAM of another storage node. Similarly, performance of a local SCM of the storage node is higher than that of an SCM of another storage node, and so on. Therefore, memory space will be preferentially allocated from a local space of the storage node unless the local space is insufficient. If the local space is not enough, it will be allocated from another storage node at the same tier.

Figure 6:
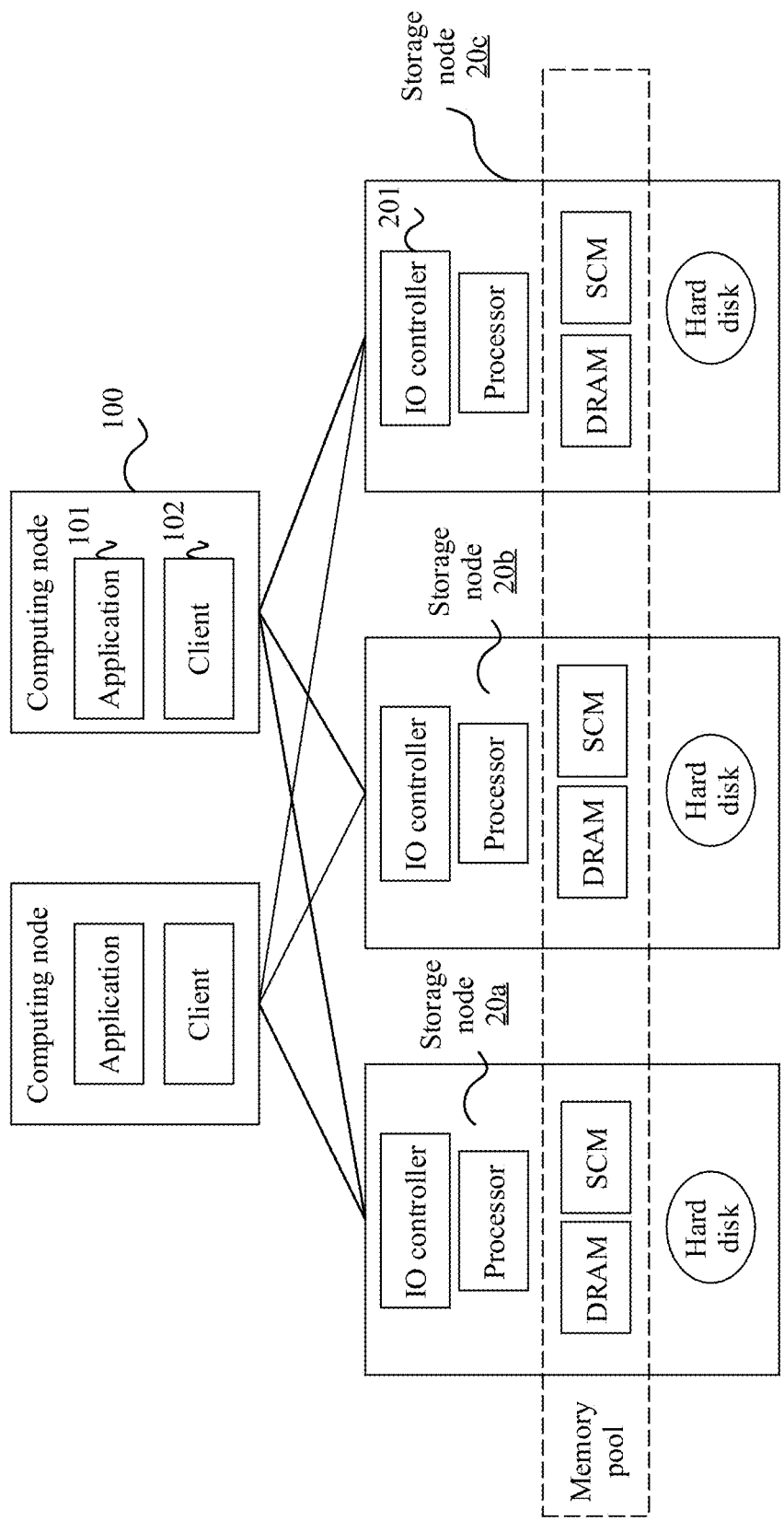
FIG. 6 is a schematic architectural diagram of another memory pool according to an embodiment.

The memory pool shown in FIG. 4 or FIG. 5 includes all types of storage devices in the storage node. However, in another implementation, as shown in FIG. 6, the memory pool may include only some types of storage devices. For example, the memory pool includes only storage devices with relatively high performance such as a DRAM and an SCM, and excludes storage devices with relatively low performance such as a hard disk.

Figure 7:
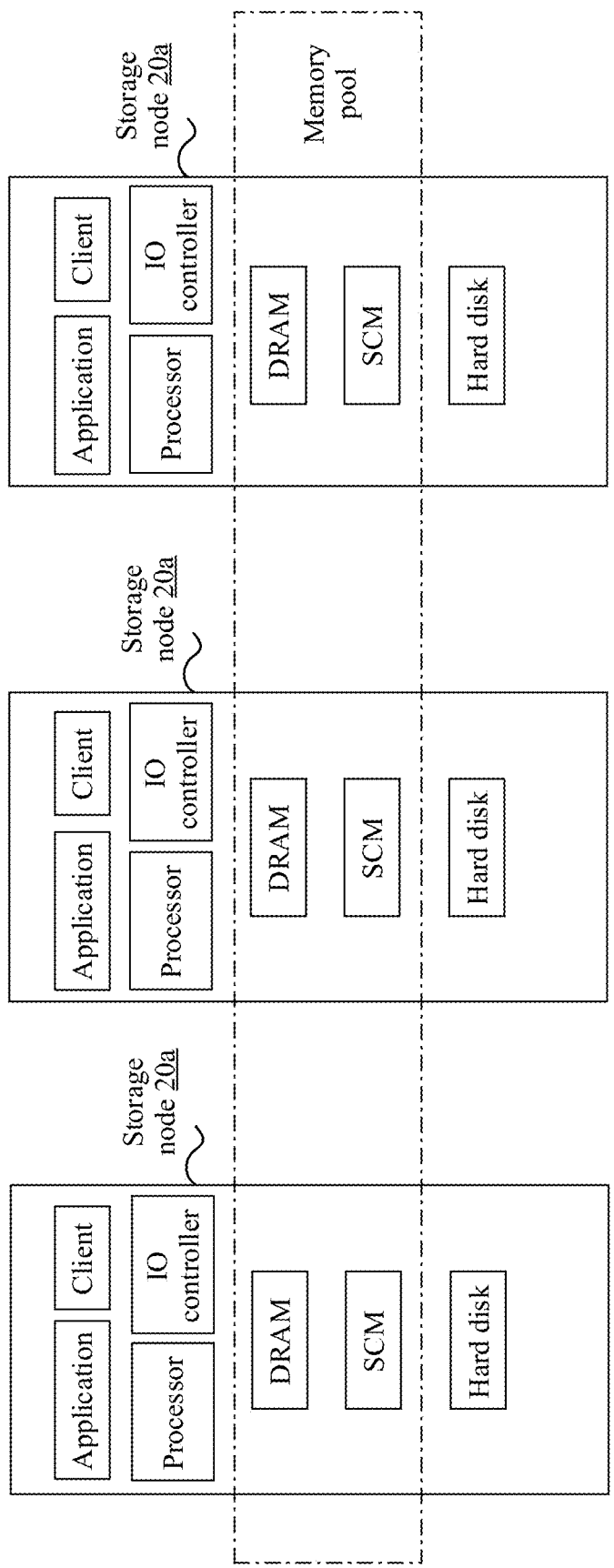
FIG. 7 is a schematic architectural diagram of another memory pool according to an embodiment.

For a network architecture of another memory pool provided in an embodiment, refer to FIG. 7. As shown in FIG. 7, in this network architecture, a storage node and a computing node are integrated into a same physical device. In this embodiment, the integrated device is collectively referred to as a storage node. Applications are deployed inside the storage node 20. Therefore, the applications may directly trigger a data write request or a data read request through a client in the storage node 20 to be processed by the storage node 20 or sent to another storage node 20 for processing. In this case, the data read/write request sent by the client to the local storage node 20 is specifically a data access request sent by the client to the processor. In addition, components included in the storage node 20 and functions of the components are similar to those of the storage node 20 in FIG. 6. Details are not described herein again. Similar to the memory pool shown in any one of FIG. 4 to FIG. 6, the memory pool in this network architecture may include all types of storage devices in the storage node, or may include only some types of storage devices. For example, the memory pool includes only storage devices with relatively high performance such as a DRAM and an SCM, and excludes storage devices with relatively low performance such as a hard disk (as shown in FIG. 7).

In addition, in the memory pools shown in FIG. 4 to FIG. 7, not every storage node in a storage node cluster needs to contribute storage space to the memory pool, and the memory pool may cover only some storage nodes in the cluster. In some application scenarios, two or more memory pools may be further created in the storage node cluster. Each memory pool covers a plurality of storage nodes, and these storage nodes provide storage space for the memory pool. The storage nodes occupied by different memory pools may be the same or may not be the same. In conclusion, the memory pool in this embodiment is established in at least two storage nodes, and storage space included in the memory pool comes from at least two different types of storage devices.

Figure 8:
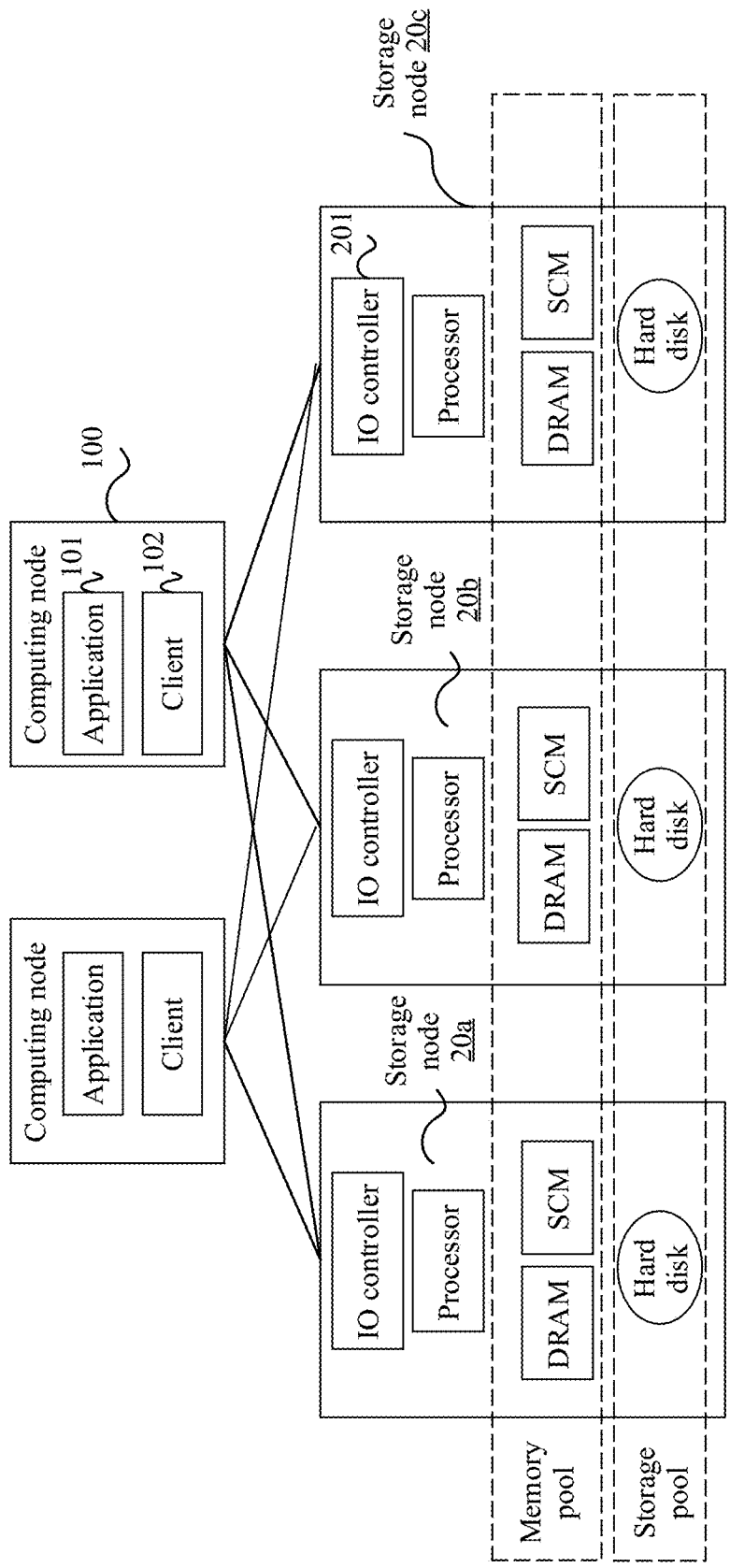
FIG. 8 is a schematic architectural diagram of a storage pool according to an embodiment.

When the memory pool includes storage devices with relatively high performance (such as a DRAM and an SCM) in the storage cluster, the management node may further use storage devices with relatively low performance (such as a hard disk) in the storage node cluster to construct a storage pool. In FIG. 8, the network architecture shown in FIG. 6 is used as an example to describe a storage pool. Similar to a memory pool, the storage pool shown in FIG. 8 also crosses at least two storage nodes, and storage space of the storage pool includes one or more types of hard disks in the at least two storage nodes. When a storage node cluster includes both a memory pool and a storage pool, the storage pool is configured to persistently store data, especially less frequently accessed data, and the memory pool is configured to temporarily store data, especially more frequently accessed data. Specifically, when a data volume of the data stored in the memory pool reaches a specified threshold, some data in the memory pool is written into the storage pool for storage. It may be understood that the storage pool may also be established in the network architecture shown in FIG. 7, and an implementation principle of the storage pool is similar to that described above. However, the storage pool is not a focus of discussion in this application, and the memory pool continues to be discussed in the following.

Creation of the memory pool is described. Each storage node 20 periodically reports status information of storage devices to a management node through a heartbeat channel. One or more management nodes may be deployed. The management node may be deployed as an independent node in a storage node cluster, or may be deployed together with a storage node 20. In other words, one or more specific storage nodes 20 serve as the management node. The status information of the storage devices includes but is not limited to: a type and a health status of various types of storage devices included in the storage node, and a total capacity and an available capacity of each type of storage devices. The management node creates the memory pool based on collected information. The creation means that storage space provided by the storage nodes 20 is gathered as the memory pool for unified management. Therefore, physical space of the memory pool comes from various types of storage devices included in the storage nodes. However, in some scenarios, the storage node 20 may selectively provide a storage device for the memory pool based on a status of the storage node 20, for example, a health status of the storage device. In other words, some storage devices in some storage nodes are not a part of the memory pool.

After collecting the information, the management node needs to perform unified addressing on the storage space that is included in the memory pool. Through unified addressing, each segment of space in the memory pool has a unique global address. The space indicated by the global address is unique in the memory pool, and each storage node 20 knows a meaning of the address. After physical space is allocated to a segment of space in the memory pool, a global address of the space includes a physical address corresponding to the global address, and the physical address indicates a specific storage device in which the space indicated by the global address is actually located in a specific storage node and an offset of the space in the storage device, that is, a location of the physical space. Each segment of space refers to a "page", which will be described in detail in the following. In an actual application, to ensure data reliability, an erasure coding (erasing coding, EC) parity mechanism or a multi-copy mechanism is usually used to implement data redundancy. The EC parity mechanism means that data is divided into at least two data fragments, and parity fragments of the at least two data fragments are calculated according to a specific parity algorithm. When one data fragment is lost, another data fragment and the parity fragments may be used for data restoration. Therefore, a global address of the data is a set of a plurality of fine-grained global addresses, and each fine-grained global address corresponds to a physical address of one data fragment/parity fragment. The multi-copy mechanism means that at least two identical data copies are stored, and the at least two data copies are stored in two different physical addresses. When one data copy is lost, another data copy can be used for restoration. Therefore, the global address of the data is also a set of a plurality of finer-grained global addresses, and each finer-grained global address corresponds to a physical address of one data copy.

The management node may allocate physical space to each global address after creating the memory pool, or may allocate, when receiving a data write request, physical space to a global address corresponding to the data write request. A correspondence between each global address and a physical address of the global address is recorded in an index table, and the management node synchronizes the index table to each storage node 20. Each storage node 20 stores the index table, so that a physical address corresponding to the global address is queried according to the index table when data is subsequently read or written.

In some application scenarios, the memory pool does not directly expose storage space of the memory pool to the computing node 100, but virtualizes the storage space into a logical unit (LU) for the computing node 100 to use. Each logical unit has a unique logical unit number (LUN). Because the computing node 100 can directly sense the logical unit number, a person skilled in the art usually directly uses the LUN to refer to the logical unit. Each LUN has a LUN ID, where the LUN ID is used to identify the LUN. In this case, the memory pool provides storage space for the LUN with a granularity of a page. In other words, when the storage node 20 applies to the memory pool for space, the memory pool allocates the space to the storage node 20 by a page or an integer multiple of a page. A size of a page may be 4 KB, 8 KB, or the like. A size of a page is not limited in this application. A specific location of data in a LUN may be determined based on a start address and a length of the data. A person skilled in the art usually refers to the start address as a logical block address (LBA). It can be understood that three factors such as the LUN ID, the LBA, and the length identify a determined address segment, and an address segment can be indexed to a global address. To ensure that data is evenly stored in each storage node 20, the computing node 100 usually performs routing in a distributed hash table (DHT) manner, and evenly divides a hash ring into several parts in the distributed hash table manner. Each part is referred to as a partition, and the partition corresponds to one of the foregoing address segments. All data access requests sent by the computing node 100 to the storage node 20 are located to an address segment, for example, data is read from the address segment, or data is written into the address segment.

In the foregoing application scenario, the computing node 100 and the storage node 20 communicate with each other by using LUN semantics. In another application scenario, the computing node 100 communicates with the storage node 20 by using memory semantics. In this case, the IO controller 22 maps DRAM space of the IO controller 22 to the computing node 100, so that the computing node 100 can sense the DRAM space (which is referred to as virtual space in this embodiment), and access the virtual space. In this scenario, a data read/write request sent by the computing node 100 to the storage node 20 no longer carries a LUN ID, an LBA, and a length, but carries other logical addresses, for example, a virtual space ID, and a start address and a length of the virtual space. In another application scenario, the IO controller 22 may map space in a memory pool managed by the IO controller 22 to the computing node 100, so that the computing node 100 can sense the space and obtain a global address corresponding to the space. For example, an IO controller 22 in a storage node 20*a* is configured to manage storage space, provided by the storage node 20*a*, in the memory pool. An IO controller 22 in a storage node 20*b* is configured to manage storage space, provided by the storage node 20*b*, in the memory pool. An IO controller 22 in a storage node 20*c* is configured to manage storage space, provided by the storage node 20*c*, in the memory pool. Therefore, the entire memory pool is visible to the computing node 100. In this case, when sending the to-be-written data to the storage node, the computing node 100 may directly specify a global address of the data.

The following describes a space allocation process by using an example in which an application applies to a memory pool for storage space. In a case, the application refers to an internal service of a storage node. For example, a memory application instruction is generated inside the storage node 20*a*, and the memory application instruction includes a size of applied space and a type of a memory. For ease of understanding, it is assumed herein that the applied space is 16 KB, and the memory is an SCM. In short, a size of the applied space is determined by a size of the stored data, and the type of the applied memory is determined by frequency information of the data. The storage node 20*a* obtains a segment of free global addresses from the stored index table. For example, an address range is [000001-000004], where space whose address is 000001 is a page. The free global address means that the global address is not occupied by any data. Then, the storage node 20*a* queries whether a local SCM has 16 KB free space. If the local SCM has 16 KB free space, the storage node 20*a* allocates space locally to the global address; or if the local SCM does not have 16 KB free space, the storage node 20*a* continues to query whether an SCM of another storage node 20 includes 16 KB free space. This step may be implemented by sending a query instruction to the other storage node 20. Because there is a distance between the storage node 20 and the storage node 20*a*, to reduce a latency, when the storage node 20*a* cannot allocate 16 KB free space locally, the storage node 20*a* may preferentially perform a query on a closer storage node 20. After obtaining the physical address, the storage node 20a records a correspondence between the global address and the physical address in the index table, and synchronizes the correspondence to another storage node. After determining the physical address, the storage node 20a may use space corresponding to the physical address to store data. In another case, the application refers to an application 101 in the computing node 100. In this case, a memory application instruction is generated by the computing node 100 and then sent to the storage node 20a. In this case, the user may specify, by using the computing node 100, a size of applied space and a type of a storage device.

A function of the foregoing index table is mainly to record a correspondence between a global address and a partition ID, and a correspondence between a global address and a physical address. In addition, the index table may be further used to record attribute information of data, for example, frequency information or a data residence policy of data whose global address is 000001. Subsequently, data may be migrated between various storage devices or attributes may be set, based on the attribute information. It should be understood that the attribute information of the data is merely an option of the index table, and is not necessarily recorded.

When a new storage node is added to the storage node cluster, the management node collects node update information, adds the new storage node into the memory pool, performs addressing on storage space included in the storage node to generate a new global address, and updates a correspondence between a partition and a global address (because a total quantity of partitions remains unchanged regardless of scaling out or scaling in). Scaling out is also applicable to a case in which a memory or a hard disk is added to some storage nodes. The management node periodically collects status information of a storage device included in each storage node. If a new storage device is added, the new storage device is added to a memory pool, addressing is performed on new storage space, to generate a new global address, and the correspondence between the partition and the global address is updated. Similarly, the memory pool provided in this embodiment also supports scaling in, provided that the correspondence between the global address and the partition is updated.

Each storage device in the memory pool provided in this embodiment provides a memory interface for the processor, so that the processor senses a segment of continuous space and can directly perform a read/write operation on the storage device in the memory pool.

In a storage system in this embodiment, a memory pool is created based on storage devices with a plurality of types of performance, and these storage devices with the plurality of types of performance are located in different storage nodes, thereby implementing a cross-node memory pool that integrates storage devices with different performance. In this way, various types of storage devices (regardless of memories or hard disks) can serve as storage resources to provide storage services for upper-layer applications, thereby better using their performance advantages. Because the memory pool includes storage devices with different performance, data can be controlled to be migrated between the storage devices with different performance based on an access frequency of the data. The data can be migrated to a high-performance storage device when an access frequency of the data is relatively high, so as to improve data reading efficiency; and the data can be migrated to a low-performance storage device when the access frequency of the data is relatively low, so as to save storage space of the high-performance storage device. In addition, the memory pool in this application provides storage space for a computing node or a LUN, and changes a processor-centric architecture of a memory resource.

Figure 9:
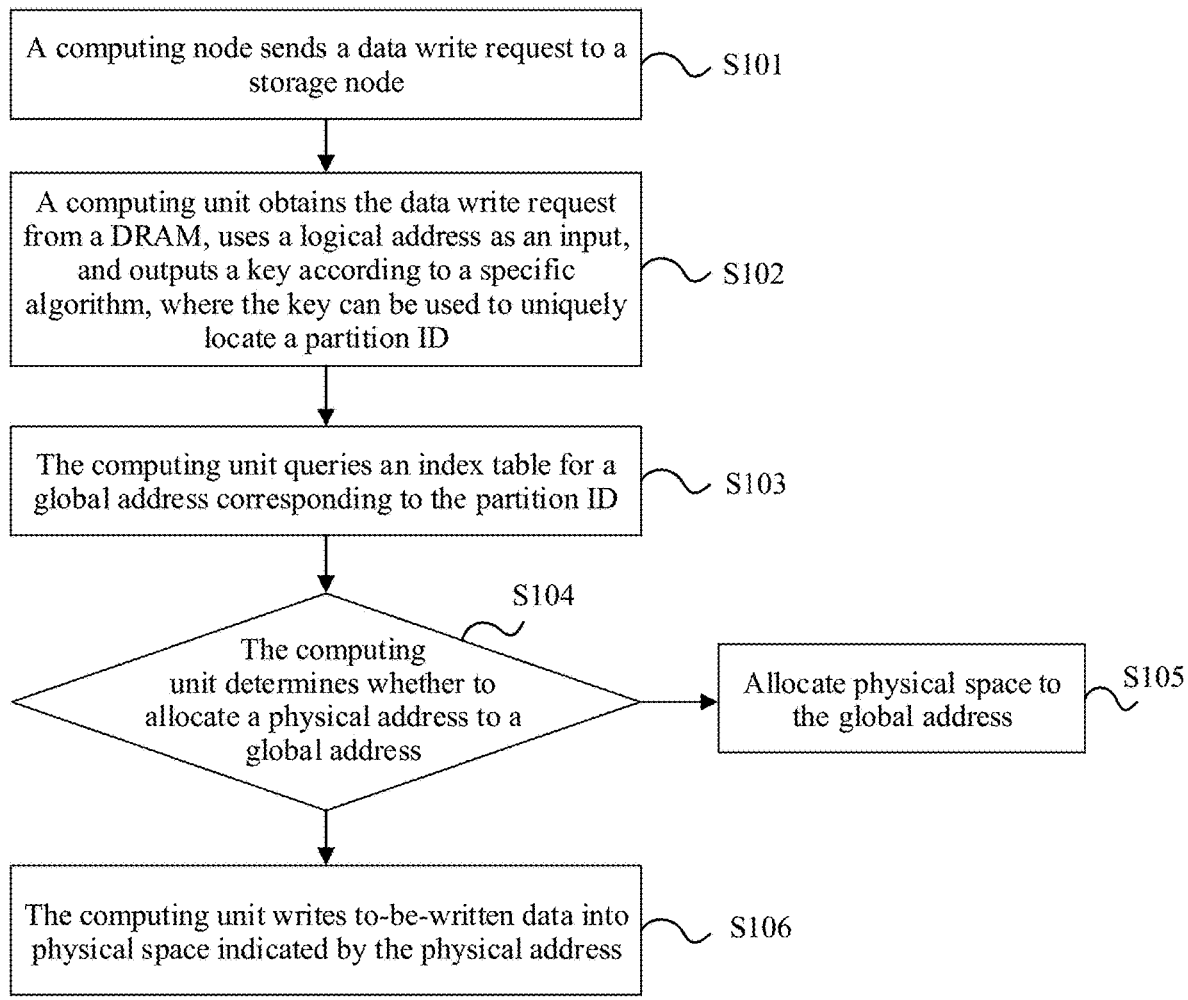
FIG. 9 is a schematic flowchart of a data write method according to an embodiment.

The following describes a process of performing a data writing method. FIG. 9 is a schematic flowchart of performing the method according to an embodiment. As shown in FIG. 9, the method includes the following steps:

S101: A computing node 100 sends a data write request to a storage node, where the data write request carries to-be-written data and a logical address of the to-be-written data. In an application scenario of LUN semantics, the logical address includes a LUN ID, an LBA, and a length. In an application scenario of memory semantics, the logical address includes an ID, a start address, and a length of virtual space. After receiving the data write request, a communication unit 220 of the storage node stores the data write request in a DRAM 222.

S102: A computing unit 221 obtains the data write request from the DRAM 222, uses the logical address as an input, and outputs a key according to a specific algorithm, where the key can be used to uniquely locate a partition ID.

S103: The computing unit 221 queries an index table for a global address corresponding to the partition ID.

S104: The computing unit 221 determines whether to allocate a physical address to the global address; and if determining not to allocate a physical address to the global address, performs S105: allocating physical space to the global address, and creating a correspondence between the global address and the physical address. For a specific allocation manner, refer to the foregoing space allocation procedure. If a determining result is that a physical address has been allocated to the global address, S106 is performed.

If a multi-copy mechanism is used to ensure data reliability, it indicates that a plurality of copies of the to-be-written data need to be stored in a storage node cluster, and each copy is stored in a different physical address. Processes of writing all the copies are similar. Therefore, an example in which one copy is written is used for description herein.

S106: The computing unit 221 writes the to-be-written data into a location of the physical space indicated by the physical address. The physical address indicates a storage node in which the physical space is located, a storage device in the storage node, and an offset in the storage device. Therefore, an IO controller 22 can directly store the to-be-written data according to the address. For example, if the physical space indicated by the physical address is located in an SCM of the storage node, the IO controller 22 performs a data write action. If the physical space indicated by the physical address is located in a hard disk in the storage node, the computing unit 221 indicates the communication unit 220 to send the data write request to an IO controller 24. The IO controller 24 performs a data write action. If the physical space indicated by the physical address is located in another storage node, the computing unit 221 indicates the communication unit 220 to send the to-be-written data to the other storage node, and indicates the node to write the to-be-written data into the location of the physical space indicated by the physical address.

If an EC parity mechanism is used, in the foregoing procedure, the computing unit 221 obtains the to-be-written data in the data write request from the DRAM 222, divides the to-be-written data into a plurality of data fragments, and calculates and generates parity fragments of the plurality of data fragments. Each data fragment or parity fragment has its own logical address, and the logical address is a subset of a logical address carried in the data write request. The computing unit 221 uses a logical address of each data fragment/parity fragment as an input, and outputs a key according to a specific algorithm. The key can be used to uniquely locate a partition ID. The computing unit 221 queries the index table for a global address corresponding to the partition ID, further obtains a physical address corresponding to the global address, and then stores each data fragment or parity fragment in the location of the space indicated by the physical address.

Figure 10:
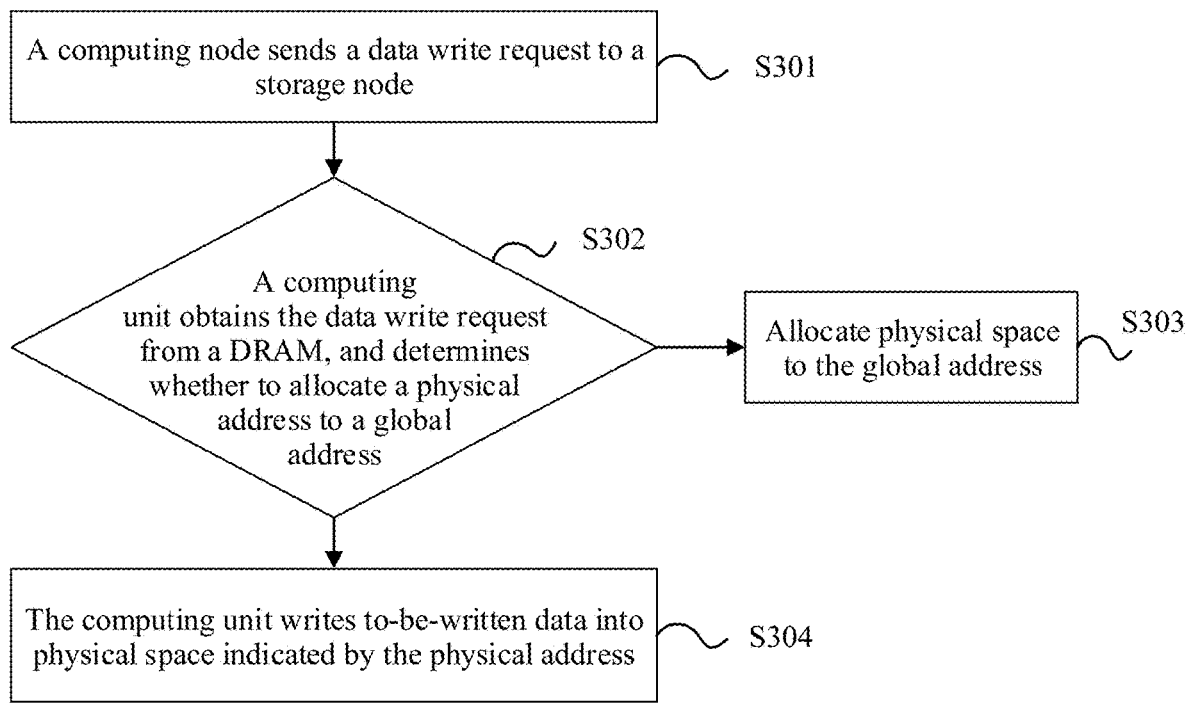
FIG. 10 is a schematic flowchart of another data write method according to an embodiment.

An embodiment provides another data write method. In this method, an IO controller 22 in each storage node 20 provides a global address of a memory pool managed by the IO controller 22 to a computing node 100, so that the computing node 100 can sense space of the memory pool and access the storage node 20 by using the global address. In this case, a data write request sent by the computing node 100 to the storage node 20 carries the global address instead of a logical address. FIG. 10 is a schematic flowchart of performing the method according to an embodiment. As shown in FIG. 10, the method includes the following steps:

S301: A computing node 100 sends a data write request to a storage node 20, where the data write request carries to-be-written data and a global address of the to-be-written data. A bitmap about global addresses of a memory pool is stored in the computing node 100. The bitmap records global addresses corresponding to several pages in the memory pool and usage of the pages. For example, if a record corresponding to a global address of a specific page is "1", it indicates that the page has stored data. If a record corresponding to a global address of a page is "0", it indicates that the page has not stored data and is a free page. Therefore, the computing node may learn, based on the bitmap, that storage space indicated by specific global addresses has stored data and that storage space indicated by specific global addresses is free. When sending the data write request, the computing node may select a global address of a free page, and include the global address in the data write request. Specifically, after completing execution of a data write request, the storage node 20 sends a response message to the computing node 100. The computing node 100 may mark, in the bitmap based on the response message, a global address (set to "1") of a page corresponding to the request. After receiving the data write request, a communication unit 220 of the storage node 20 stores the data write request in a DRAM 222.

In addition, as shown in FIG. 1, the storage node cluster includes a plurality of storage nodes 20. In this case, when sending the data write request, the computing node 100 needs to select a specific storage node 20 according to a global address. It can be learned from the foregoing description that the global address corresponds to a physical address. The physical address indicates a specific storage device in which space indicated by the global address is located in a specific storage node. Therefore, a specific storage node 20 can manage only a global address corresponding to a storage device of the storage node 20, and perform a data write or read operation on the global address. If the storage node 20 receives data to be written into another storage node, the storage node 20 may forward the data to the other storage node. However, in this case, a processing latency is relatively large.

To reduce an access latency, when addressing the memory pool, a management node may embed one or more bytes into the global address. The byte is used to indicate a specific storage node in which space indicated by the global address is located. Alternatively, addressing is performed according to a specific algorithm, so that each global address corresponds to a unique storage node. Therefore, the computing node 100 may identify a storage node corresponding to the global address, and directly send the data write request to the storage node for processing.

S302: A computing unit 221 obtains the data write request from the DRAM 222; determines whether to allocate a physical address to the global address, and if determining not to allocate a physical address to the global address, performs S303: allocating physical space to the global address, and creating a correspondence between the global address and the physical address. For a specific allocation manner, refer to the foregoing space allocation procedure. If a determining result is that a physical address has been allocated to the global address, S304 is performed.

S304: The computing unit 221 writes the to-be-written data into the physical space indicated by the physical address. For this step, refer to the description of S106 in FIG. 9. Details are not described herein again.

In addition, similar to the process described in FIG. 9, in this embodiment, a multi-copy mechanism or an EC parity mechanism may also be used to ensure data reliability. For this part, refer to the description in FIG. 9. When data is initially written into a storage node cluster, the data is usually stored at a DRAM tier in a memory pool. As a data access frequency decreases or a space capacity of the DRAM tier decreases, the storage node cluster triggers data migration internally. A computing node cluster is unaware of this process. A data migration policy is stored in the management node, and the management node controls a data migration operation according to the data migration policy. The data migration policy includes but is not limited to: a trigger condition for performing the data migration operation, for example, periodically performing the data migration operation, or performing the data migration operation when a specific condition is met. The specific condition herein may be that an access frequency of the data is higher than or lower than a specified threshold, or may be that an available capacity of a storage device in which the data is located is higher than or lower than a specified threshold, or the like. The "control" means that the management node indicates each storage node 20 to monitor an access frequency of data stored in the storage node 20 and indicates the storage node 20 to migrate, between the storage devices, the data stored in the storage node 20.

In addition to periodically triggering the data migration operation, when the computing node 100 sends a data write request to the storage node, frequency information of the data (which is used to indicate an access frequency of the data) may be carried in the data write request. When the storage node executes the data write request, an execution manner is: first writing the data into a DRAM, and then immediately performing a data migration operation based on the frequency information, to migrate the data from the DRAM into a storage device matching the frequency information of the data. Alternatively, the storage node may obtain frequency information of the data based on a metadata structure, a logical address, or the like of the data, and then perform a data migration operation based on the frequency information. In another execution manner, the storage node directly determines, based on the frequency information, a storage device matching the frequency information of the data, and directly writes the data into the storage device through the IO controller.

In addition, the computing node 100 may also specify a residence policy of the data in the data write request. The residence policy means that data of a specific type needs to be stored in a specific type of storage device for a long time.

Once such data is stored in a specified storage device, no data migration operation is performed on the data regardless of whether an access frequency of the data is increased or decreased.

Target data located at the DRAM tier is used as an example. Assuming that the target data is located in a storage node 20a, the storage node 20a periodically collects statistics on an access frequency of the target data, and migrates the target data to an SCM tier or another tier when the access frequency is lower than an access threshold of the DRAM tier. In an optional solution, each tier of storage devices in the memory pool has an access threshold interval. When an access frequency of data is higher than a highest value of the interval or an access frequency of the data is lower than a lowest value of the interval, it indicates that the data needs to be migrated to a tier matching the access frequency of the data. In another optional solution, an access threshold interval of each tier of storage devices is not set, but only the access frequency is compared with the specified access threshold. When the access frequency is lower than the access threshold, it indicates that the data needs to be migrated to a tier with lower performance. The target data is still used as an example. If a current access frequency of the target data falls within an access frequency range of a hard disk tier, it is first determined whether a local hard disk of the storage node 20a has free space. If the local hard disk of the storage node 20a has free space, the target data is migrated to the local hard disk of the storage node 20a; otherwise, the target data is sent to another storage node, for example, a storage node 20b. The storage node 20b is indicated to write the target data into a hard disk of the storage node 20b. Before and after the migration, a global address of the target data does not change because an upper-layer application is unaware of the migration and a physical address of the target data changes. After the migration is completed, each storage node 20 updates a correspondence between the global address and the physical address of the target data in an index table of the storage node 20.

In addition to the data migration between the tiers based on the data access frequency (also referred to as a frequency), another migration policy is to migrate data based on an available capacity of each tier. It is known that a higher-tier storage device has better performance and requires higher costs, and its storage space is more precious than that of a lower-tier storage device. For example, when an available capacity of the DRAM tier is lower than a specified capacity threshold, the DRAM tier needs to migrate a part of data stored in the DRAM tier to the SCM tier or another tier, to release more space to accommodate newly written data. For a specific part of data that is selected and migrated to the lower-tier storage device, refer to an existing cache replacement algorithm. Details are not described herein. Similarly, the SCM tier or the other tier also has its own capacity threshold. When an available capacity of the tier is lower than the capacity threshold, a part of stored data is migrated to another tier.

As mentioned above, the memory pool provides storage space externally with a granularity of a page. Therefore, statistics on an access frequency of the data may also be collected in pages; and correspondingly, the data migration between the tiers is also implemented in pages. However, in product practice, an application often needs to allocate an object with a finer granularity of, for example, a data item based on a page. If a size of a page is 4 KB, a size of a data item is 1 KB, 2 KB, or 3 KB (as long as the size is less than the size of the page). In this case, an access frequency with a granularity of a page is not accurate. Some data items on a page may be frequently accessed; however, other data items on this page are scarcely accessed. If the access frequency on pages is collected with a granularity of a page, this page will reside on a DRAM or SCM medium, thereby wasting a large amount of space. Therefore, in this embodiment, statistics on an access frequency with a granularity of a data item is further collected, data migration is performed with a granularity of a data item, and then cold and hot pages are aggregated. In this way, more efficient swap-in and swap-out performance can be implemented.

Figure 11:
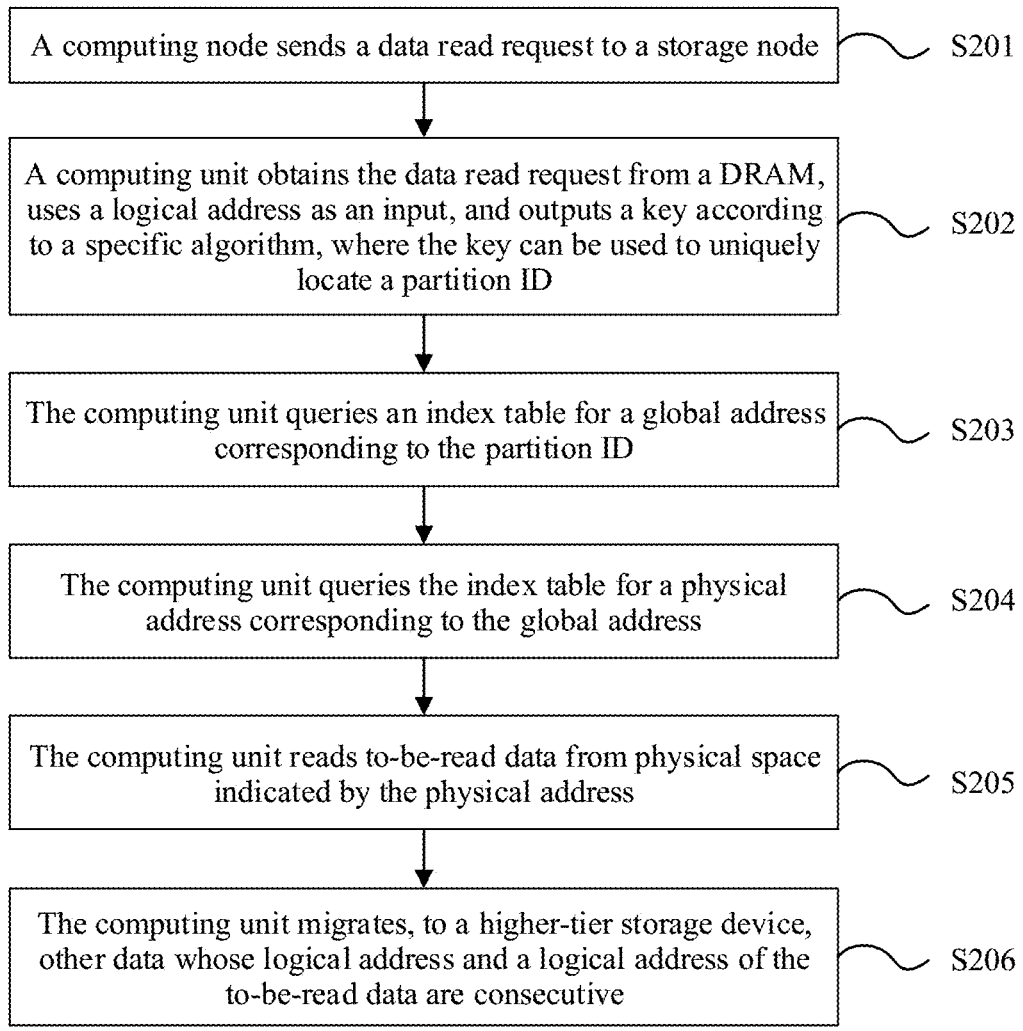
FIG. 11 is a schematic flowchart of a data read method according to an embodiment.

The following describes a process of performing a data read request method. FIG. 11 is a schematic flowchart of performing a data read request method according to an embodiment. As shown in FIG. 11, the method includes the following steps:

S201: A computing node 100 sends a data read request to a storage node, where the data read request carries a logical address of to-be-read data, and an IO controller 22 of the storage node receives the data read request. In an application scenario of LUN semantics, the logical address includes a LUN ID, an LBA, and a length. In an application scenario of memory semantics, the logical address includes an ID, a start address, and a length of virtual space. After receiving the data read request, a communication unit 220 of the storage node stores the data write request in a DRAM 222.

S202: A computing unit 221 obtains the data read request from the DRAM 222, uses the logical address as an input, and outputs a key according to a specific algorithm, where the key can be used to uniquely locate a partition ID.

S203: The computing unit 221 queries an index table for a global address corresponding to the partition ID.

S204: The computing unit 221 queries the index table for a physical address corresponding to the global address.

S205: The computing unit 221 reads the to-be-read data from physical space indicated by the physical address, and the communication unit 220 returns the to-be-read data to the computing node 100. The physical address indicates a storage node in which the physical space is located, a storage device in the storage node, and an offset in the storage device. Therefore, the computing unit 221 can directly read the to-be-read data according to the address. If the physical space indicated by the physical address is located in another storage node, the data read request is sent to the other storage node, and the node is indicated to read the data from the physical space indicated by the physical address.

If a multi-copy mechanism is used to store data, the storage node may read any data copy according to the foregoing procedure, and send the data copy to the computing node 100. If an EC parity mechanism is used, the storage node needs to read each data fragment and each parity fragment according to the foregoing procedure, combine the data fragment and the parity fragment to obtain the to-be-read data, verify the to-be-read data, and return the to-be-read data to the computing node 100 after verifying that the to-be-read data is correct. It may be understood that the data read method shown in FIG. 11 corresponds to the data write method shown in FIG. 9. Therefore, the data read request in the method carries the logical address of the to-be-read data. An embodiment further provides another data read method. The method corresponds to the data write method shown in FIG. 10. In the method, the data read request carries a global address of to-be-read data, and a computing unit 221 can directly query a physical address according to the global address, to obtain the to-be-read data.

In addition, the memory pools shown in FIG. 1 to FIG. 8 further support a data prefetching mechanism. A person skilled in the art may understand that a speed of reading data from a storage device with relatively high performance is higher than a speed of reading data from a storage device with relatively low performance. Therefore, if the to-be-read data is hit in the storage device with relatively high performance, the to-be-read data does not need to be read from the storage device with relatively low performance. In this way, data reading efficiency is relatively high. To increase a data hit rate of a cache, a common practice is to pre-read a segment of data from the storage device with relatively low performance, and write the segment of data into the storage device with relatively high performance. In this case, when the computing node 100 sends a data read request to request to read the segment of data, because the data has been read in advance to the storage device with relatively high performance, the IO controller can directly read the data from the storage device with relatively high performance. For a segment of data with consecutive logical addresses, there is a relatively high possibility that the data is to be read together. Therefore, in practice, data is usually prefetched according to a logical address. Data prefetching modes include synchronous prefetching and asynchronous prefetching. Synchronous prefetching means that when a data read request is executed and to-be-read data is not hit in a higher-tier storage device, data whose logical address and a logical address of the to-be-read data are consecutive is read from a lower-tier storage device according to a logical address of the to-be-read data, and is written into a higher-tier storage device. Asynchronous prefetching means that when a data read request is executed and to-be-read data is hit in a higher-tier storage device, data whose logical address and a logical address of the to-be-read data are consecutive is read from a lower-tier storage device according to a logical address of the to-be-read data, and is written into a higher-tier storage device.

With reference to FIG. 11, the method for executing the data read request may further include:

S206: The computing unit 221 migrates, to the higher-tier storage device, other data whose logical address and the logical address of the to-be-read data are consecutive. In S205, the computing unit 221 reads the to-be-read data from the physical space indicated by the physical address. The to-be-read data may be stored in a higher-tier storage device (for example, a DRAM), or may be stored in a lower-tier storage device (for example, an SCM). If the to-be-read data is stored in the DRAM, the computing unit 221 hits the to-be-read data in the DRAM. If the to-be-read data is stored in the SCM, the computing unit 221 does not hit the to-be-read data in the DRAM. In either case, the computing unit 221 can prefetch, to the DRAM, other data whose logical address and the logical address of the to-be-read data are consecutive.

Specifically, the computing unit 221 first obtains a logical address whose logical address and the logical address of the to-be-read data are consecutive. For ease of description, the logical address of the to-be-read data is referred to as a logical address 1, and a logical address consecutive to the logical address 1 is referred to as a logical address 2. The computing unit 221 uses the logical address 2 as an input, and outputs a key according to a specific algorithm. The key can be used to uniquely locate a partition ID. Then, the computing unit 221 queries the index table for a global address corresponding to the partition ID and the physical address corresponding to the global address. Finally, the computing unit 221 reads the other data from the physical space indicated by the physical address. The other data may be located in a local storage node of the computing unit 221, or may be located in another storage node. If the physical space indicated by the physical address is located in another storage node, the node reads the data from the physical space indicated by the physical address.

Similarly, if the data read request sent by the computing node 100 to the storage node 20 carries a global address, during data prefetching, data stored in an address consecutive to the global address is read in advance to a higher-tier storage device according to the global address.

Figure 12:
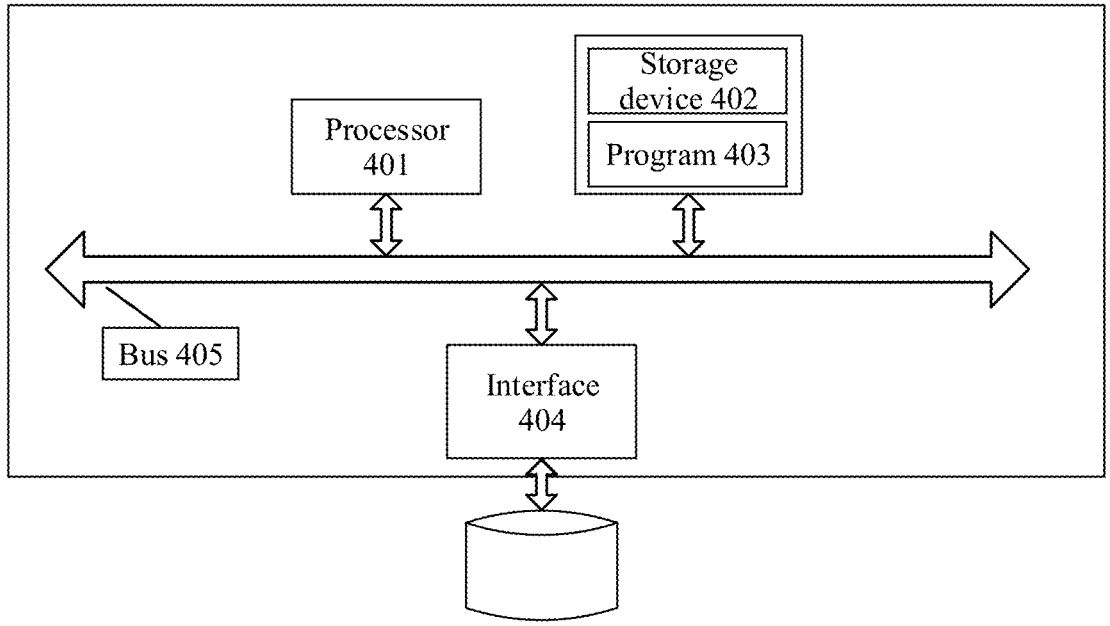
FIG. 12 is a schematic structural diagram of a management node according to an embodiment.

FIG. 12 is a schematic structural diagram of a management node according to an embodiment. The management node includes a processor 401 and a storage device 402. The storage device 402 stores a program 403. The processor 401, the storage device 402, and an interface 404 are connected to and communicate with each other through a bus 405. The processor 401 is a single-core or multi-core central processing unit or an application-specific integrated circuit, or may be configured as one or more integrated circuits for implementing this embodiment of the application. The storage device 402 may be a random access memory (Random Access Memory, RAM), or may be a non-volatile memory (non-volatile memory), for example, at least one hard disk memory. The storage device 402 is configured to store a computer-executable instruction. Specifically, the computer-executable instruction may include a program 403. When the management node runs, the processor 401 runs the program 403 to perform the following method.

For example, a memory pool is created to provide a service for storing data. The memory pool includes the first storage device and the at least two second storage devices. The processor is configured to control the data to be migrated from the first storage device to the second storage device, or to be migrated from the second storage device to the first storage device.

Optionally, the method further includes: obtaining status information of the storage devices, where the status information includes a type and a capacity of the first storage device and a type and a capacity of the second storage device. Therefore, when creating the memory pool, the management node is specifically configured to create the memory pool based on the status information.

Optionally, when controlling the data to be migrated from the first storage device to the second storage device, the management node is specifically configured to indicate the first storage node to obtain an access frequency of the data; and indicating the first storage node to migrate the data to the second storage device when the access frequency is lower than a specified frequency threshold.

Figure 13:
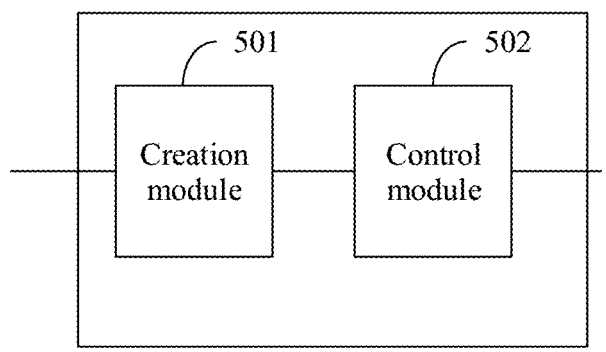
FIG. 13 is another schematic structural diagram of a management node according to an embodiment.

FIG. 13 is another schematic structural diagram of a management node according to an embodiment. The management node includes a creation module 501 and a control module 502. The creation module 501 is configured to create a memory pool to provide a service for storing data. The memory pool includes the first storage device and the at least two second storage devices. The control module 502 is configured to control the data to be migrated from the first storage device to the second storage device, or to be migrated from the second storage device to the first storage device.

Optionally, the creation module 501 is further configured to obtain status information of the storage devices, where the status information includes a type and a capacity of the first storage device and a type and a capacity of the second storage device. When creating the memory pool, the creation module 501 is specifically configured to create the memory pool based on the status information.

Optionally, when controlling the data to be migrated from the first storage device to the second storage device, the control module 502 is specifically configured to: indicate a first storage node to obtain an access frequency of the data, and indicate the first storage node to migrate the data to the second storage device when the access frequency is lower than a specified frequency threshold.

In practice, functions of both the creation module 501 and the control module 502 may be implemented by the processor 401 shown in FIG. 12 by executing the program 403, or may be independently implemented by the processor 401.

All or some of the foregoing embodiments may be implemented by using software, hardware, firmware, or any combination thereof. When software is used for implementation, all or some of the embodiments may be implemented in a form of computer program product. The computer program product includes one or more computer instructions. When the computer instructions are loaded and executed on a computer, all or some of the procedures or functions according to the embodiments of the application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium (for example, a solid-state disk (SSD)), or the like.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, or an optical disc.

In the embodiments of this application, unless otherwise stated or there is a logical conflict, terms and/or descriptions between different embodiments are consistent and may be mutually referenced, and technical features in different embodiments may be combined based on an internal logical relationship thereof, to form a new embodiment.

In this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists. A and B each may be singular or plural. In the text descriptions of this application, the character "/" indicates an "or" relationship between the associated objects. In a formula in this application, the character "/" indicates a "division" relationship between the associated objects.

It may be understood that various numbers in the embodiments of this application are merely used for differentiation for ease of description, and are not used to limit the scope of the embodiments of this application. Sequence numbers of the foregoing processes do not mean execution sequences. The execution sequences of the processes should be determined based on functions and internal logic of the processes.

The foregoing descriptions are embodiments provided in this application, but are not intended to limit this application. Any modification, equivalent replacement, or improvement made without departing from the spirit and principle of this application should fall within the protection scope of this application.

What is claimed is:

1. A storage system comprising:

a management node; and multiple storage nodes, each of the multiple storage nodes including a first storage device of a first type and a second storage device of a second type, and a performance level of the first storage device being higher than a performance level of the second storage device, wherein the first storage device includes a dynamic random access memory (DRAM), and the second storage device includes a storage class memory (SCM), wherein the management node is configured to:

create a globe cache comprising the first storage device and the second storage device in each storage node, wherein the globe cache includes a first tier comprising the first storage device in each storage node, and a second tier comprising the second storage device in each storage node, wherein the first tier is configured for storing data with a high access frequency, and the second tier is configured for storing data with a low access frequency, wherein both the first storage device and the second storage device in the globe cache have memory interfaces, and are configured to be directly accessed by a processor of each storage device through a memory bus;

monitor an access frequency of target data in the first tier, wherein the target data is located in the first storage device of a first storage node in the multiple storage nodes; and instruct the first storage node to migrate the target data from the first tier to the second tier of the globe cache, when the access frequency of the target data is lower than a threshold.

2. The storage system according to claim 1, wherein the management node is further configured to:

obtain status information of the first storage device and the second storage device in each storage node, wherein the status information comprises a type and a capacity of the first storage device and a type and a capacity of the second storage device, and the management node is configured to create the globe cache based on the status information.

3. The storage system according to claim 1, wherein the globe cache includes multiple pages, each page having a globe address and a physical address, and wherein the management node is further configured to:

allocate a globe address for each page, the globe address indicating a location within the globe cache;

create a mapping relationship between the globe address and a physical address of each page, the physical address; and record the mapping relationship into an index table.

4. The storage system according to claim 3, wherein the first storage node comprises an IO controller, the IO controller stores the index table and communicates with a computing node, and is configured to:

receive first data and a first logical address of the first data from the computing node;

identify a first global address of the first data based on the first logical address;
determine whether a first physical address has been allocated to the first global address, based on the index table; and
in response to determining that the first physical address has been allocated to the first global address, write the first data into a physical space indicated by the first physical address.

5. The storage system according to claim 4, wherein the IO controller is further configured to:
receive a data read request from the computing node, wherein the data read request comprises the first logical address;
identify the first global address based on the first logical address;
identify, based on the index table, the first physical address corresponding to the first global address; and
obtain the first data from the physical space indicated by the first physical address.

6. The storage system according to claim 5, wherein the IO controller is further configured to:
identify, based on the first logical address, other data associated with the first data, wherein the other data is located in the second tier, and a logical address of the other data is consecutive to the first logical address; and
migrate the other data to the first tier.

7. The storage system according to claim 4, wherein the computing node is located in one of the multiple storage nodes.

8. The storage system according to claim 4, wherein the computing node is separate from the multiple storage nodes.

9. The storage system according to claim 3, wherein the first storage node comprises an IO controller, the IO controller stores the index table and communicates with a computing node, and is configured to:
receive second data and a second logical address of the second data from the computing node;
identify a second global address of the second data based on the second logical address;
determine whether a second physical address has been allocated to the second global address, based on the index table; and
in response to determining that the second physical address has not been allocated to the second global address, allocate the second physical address from the first tier;
write the second data into a physical space indicated by the second physical address; and
record a mapping relationship between the second globe address and the second physical address.

10. The storage system according to claim 3, wherein the storage system further includes a computing node, and the management node is further configured to provide globe addresses of all pages in the globe cache to the computing node.

11. The storage system according to claim 10, wherein the first storage node comprises an IO controller, the IO controller stores the index table and communicates with the computing node, and is configured to:
receive third data and a third global address of the third data from the computing node, wherein the third global address is a set of the globe addresses of all pages in the global cache;
identify, a third physical address corresponding to the third global address, based on the index table; and
write the third data into a space indicated by the third physical address.

12. A method of operating a storage system, wherein the storage system includes a management node and multiple storage nodes, each of the multiple storage nodes includes a first storage device of a first type and a second storage device of a second type, a performance level of the first storage device is higher than a performance level of the second storage device, the first storage device includes a dynamic random access memory (DRAM), and the second storage device includes a storage class memory (SCM), the method comprising:
creating, by the management node, a globe cache comprising the first storage device and the second storage device in each storage node, wherein the memory pool includes a first tier comprising the first storage device in each storage node, and a second tier comprising the second storage device in each storage node, wherein the first tier is configured for storing data with a high access frequency, and the second tier is configured for storing data with a low access frequency, wherein both the first storage device and the second storage device in the globe cache have memory interfaces, and are configured to be directly accessed by a processor of each storage device through a memory bus;
monitor, by the management node, an access frequency of target data in the first tier, wherein the target data is located in the first storage device of a first storage node in the multiple storage nodes; and
instruct, by the management node, the first storage node to migrate the target data from the first tier to the second tier within the globe cache, when the access frequency of the target data is lower than a threshold.

13. The method according to claim 12, further comprising:
obtaining, by the management node, status information of the first storage device and the second storage device in each storage node, wherein the status information comprises a type and a capacity of the first storage device and a type and a capacity of the second storage device, and wherein the step of creating comprises creating the globe cache based on the status information.

14. The method according to claim 12, wherein the globe cache includes multiple pages, each page has a globe address and a physical address, and the method further comprises:
allocating a globe address for each page, the globe address indicating a location within the globe cache;
creating a mapping relationship between the globe address and a physical address of each page, the physical address; and
recording the mapping relationship into an index table.

15. The method according to claim 14, wherein the first storage node comprises an IO controller storing the index table, and the method further comprises:
receiving, by the IO controller, first data and a first logical address of the first data from the computing node;
identifying, by the IO controller, a first global address of the first data based on the first logical address;
determining, by the IO controller, whether a first physical address has been allocated to the first global address, based on the index table; and
in response to determining that the first physical address has been allocated to the first global address, writing, by the IO controller, the first data into a physical space indicated by the first physical address.

16. The method according to claim 15, further comprising:

receiving, by the IO controller, a data read request from the computing node, wherein the data read request comprises the first logical address;

identifying, by the IO controller, the first global address based on the first logical address;

identifying, by the IO controller, based on the index table, the first physical address corresponding to the first global address; and obtaining, by the IO controller, the first data from the physical space indicated by the first physical address.

17. The method according to claim 16, further comprising:

identifying, by the IO controller based on the first logical address, other data associated with the first data, wherein a logical address of the other data is consecutive to the first logical address, and the other data is located in the second s tier; and migrating, by the IO controller, the other data to the first tier.

18. The method according to claim 14, wherein the first storage node comprises an IO controller storing the index table and communicating with a computing node, and the method further comprises:

receiving, by the IO controller, second data and a second logical address of the second data from the computing node;

identifying, by the IO controller, a second global address of the second data based on the second logical address;

determining, by the IO controller, whether a second physical address has been allocated to the second global address, based on the index table; and in response to determining that the second physical address has not been allocated to the second global address, allocating, by the IO controller, the second physical address from the first tier;

writing, by the IO controller, the second data into a physical space indicated by the second physical address; and recording, by the IO controller, a mapping relationship between the second globe address and the second physical address.

19. The method according to claim 14, wherein the storage system further includes a computing node, and the method further comprises:

providing, by the management node, globe addresses of all pages in the globe cache to the computing node.

20. The method according to claim 19, wherein the first storage node comprises an IO controller communicating with the computing node and storing the index table, and the method further comprises:

receiving, by the IO controller, third data and a third global address of the third data from the computing node, wherein the third global address is a set of the globe addresses of all pages in the global cache;

identifying, by the IO controller based on the index table, a third physical address corresponding to the third global address; and writing, by the IO controller, the third data into a space indicated by the third physical address.

\* \* \* \* \*